United States Patent
Sugiyama et al.

(10) Patent No.: US 6,934,330 B2
(45) Date of Patent: *Aug. 23, 2005

(54) IMAGE PROCESSING APPARATUS

(75) Inventors: Akira Sugiyama, Kanagawa (JP); Izumi Kuramura, Kanagawa (JP)

(73) Assignee: Sony Corporation, Tokyo (JP)

( * ) Notice: Subject to any disclaimer, the term of this patent is extended or adjusted under 35 U.S.C. 154(b) by 425 days.

This patent is subject to a terminal disclaimer.

(21) Appl. No.: 10/209,356

(22) Filed: Jul. 31, 2002

(65) Prior Publication Data

US 2003/0063666 A1 Apr. 3, 2003

(30) Foreign Application Priority Data

Aug. 1, 2001 (JP) ........................................ 2001-233281

(51) Int. Cl.[7] .............................................. H04N 7/12
(52) U.S. Cl. ............. 375/240.03; 375/240; 375/240.01; 375/240.02; 375/240.12; 375/240.26
(58) Field of Search .............................. 375/240.03, 240, 375/240.01, 240.02, 240.12, 240.26

(56) References Cited

U.S. PATENT DOCUMENTS

| | | | |
|---|---|---|---|
| 5,389,973 A | | 2/1995 | Kitamura et al. |
| 5,742,342 A | * | 4/1998 | Jung ..................... 375/240.03 |
| 6,111,913 A | * | 8/2000 | Murdock et al. ...... 375/240.03 |
| 6,163,573 A | | 12/2000 | Mihara |

OTHER PUBLICATIONS

Patent Abstracts of Japan 6 319112, Nov. 15, 1994.

* cited by examiner

*Primary Examiner*—Allen Wong
(74) *Attorney, Agent, or Firm*—Frommer Lawrence & Haug LLP; William S. Frommer

(57) ABSTRACT

A quantizer scale value is detected with high accuracy. The number of effective samples of results of which DCT coefficients are quantized with each of quantizer scale values Q=1 to 31 is counted. In addition, fractional parts of quantized values are cumulated. When the number of effective samples of a cumulated value does not satisfy a predetermined value, the cumulated value is not used. When a dip point of a considered normalized cumulated value [q] quantized with the number of effective samples corresponding to each of the quantizer scale values Q clearly exists, using the relation between the normalized cumulated value [q] and normalized cumulated values [q−1] and [q+1] whose quantizer scale codes are immediately preceded and immediately followed by the quantizer scale code of the normalized cumulated value [q], it is determined whether or not the quantizer scale value Q corresponding to the normalized cumulated value [q] is a quantizer scale value Q used in the preceding encoding. Although the dip point of the normalized cumulated value [q] does not clearly exist, when the reliability of data is high, further using a normalized cumulated value [q+2] whose quantizer scale code is different by 2 from the quantizer scale code of the normalized cumulated value [q], it is determined whether or not the quantizer scale value Q corresponding to the normalized cumulated value [q] is a quantizer scale value used in the preceding encoding process.

52 Claims, 25 Drawing Sheets

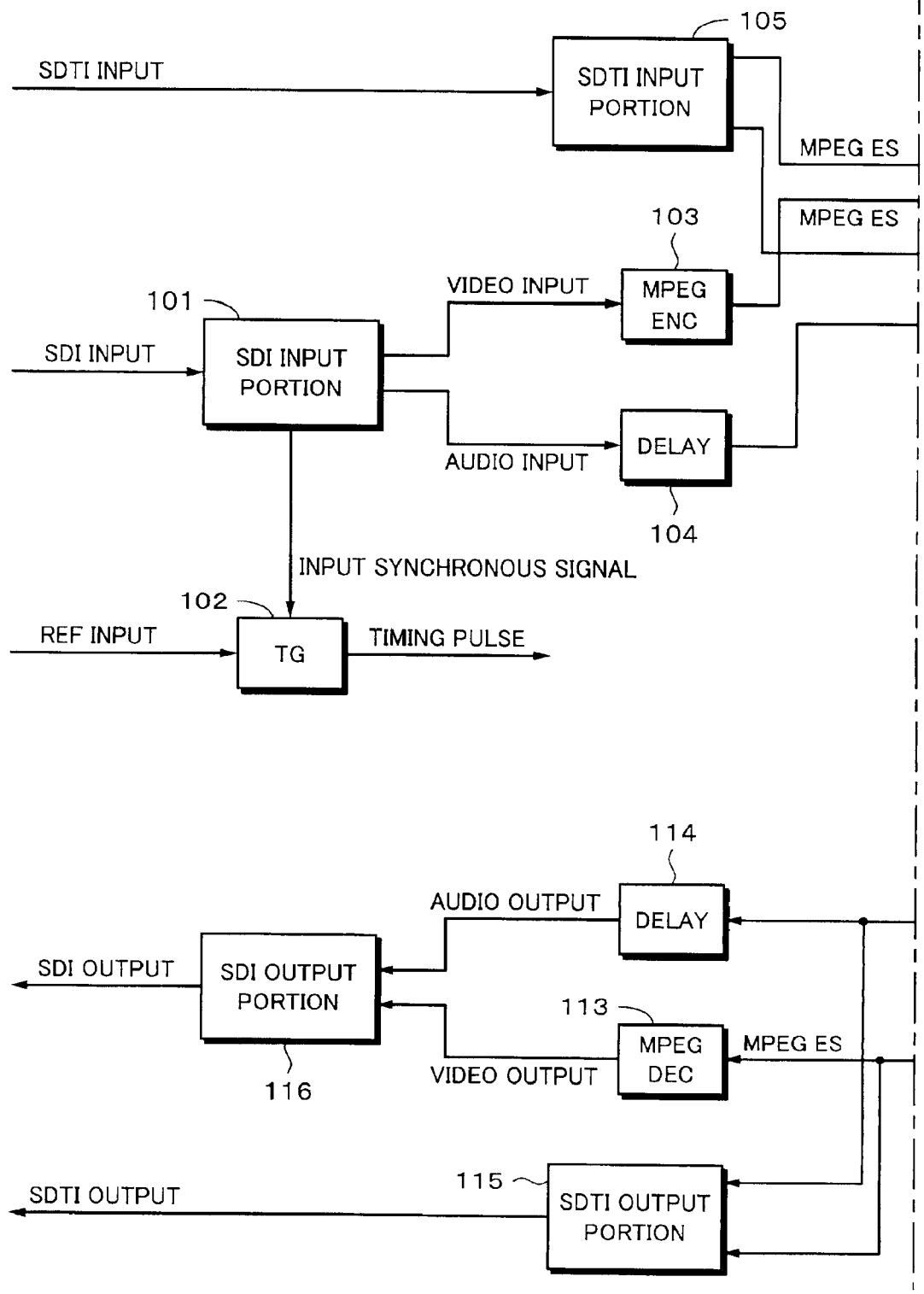

Fig. 2A
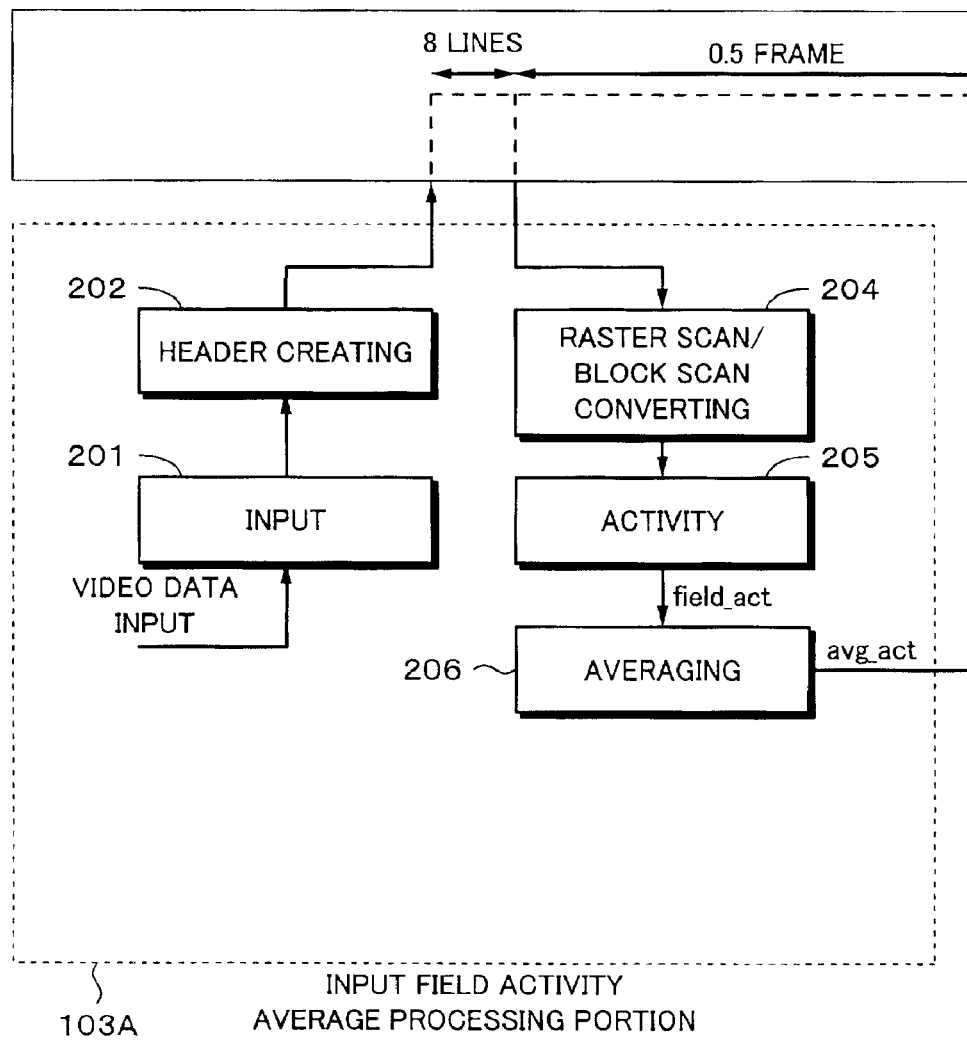
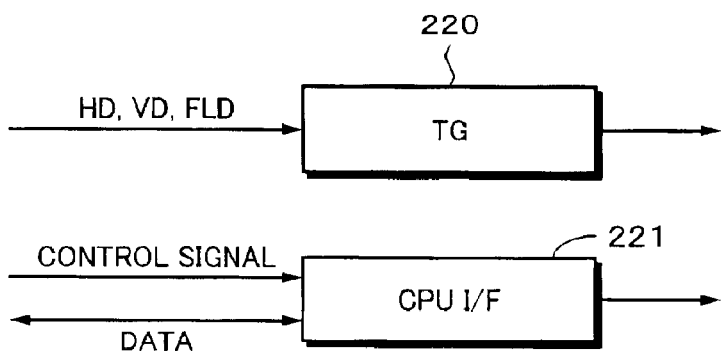

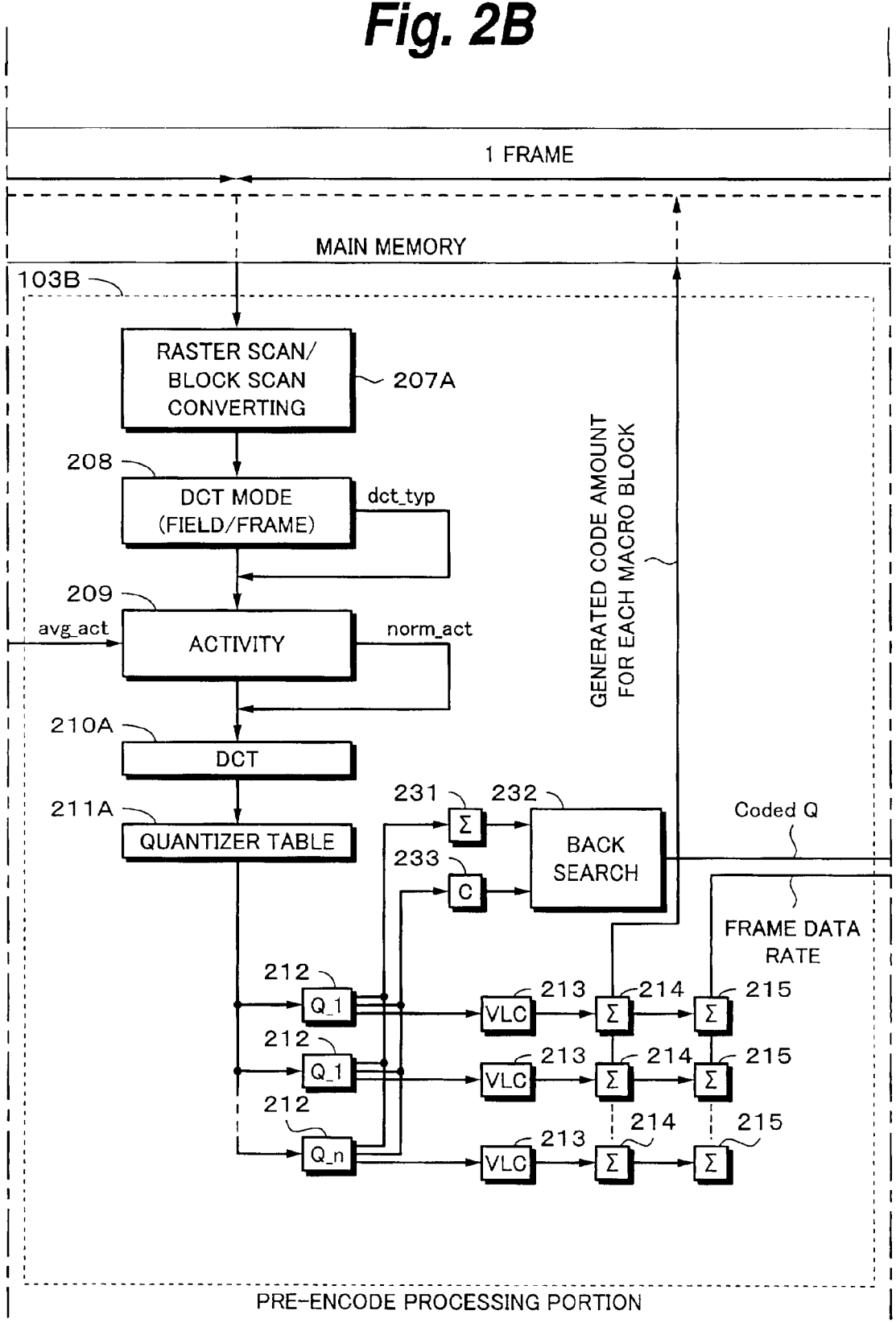

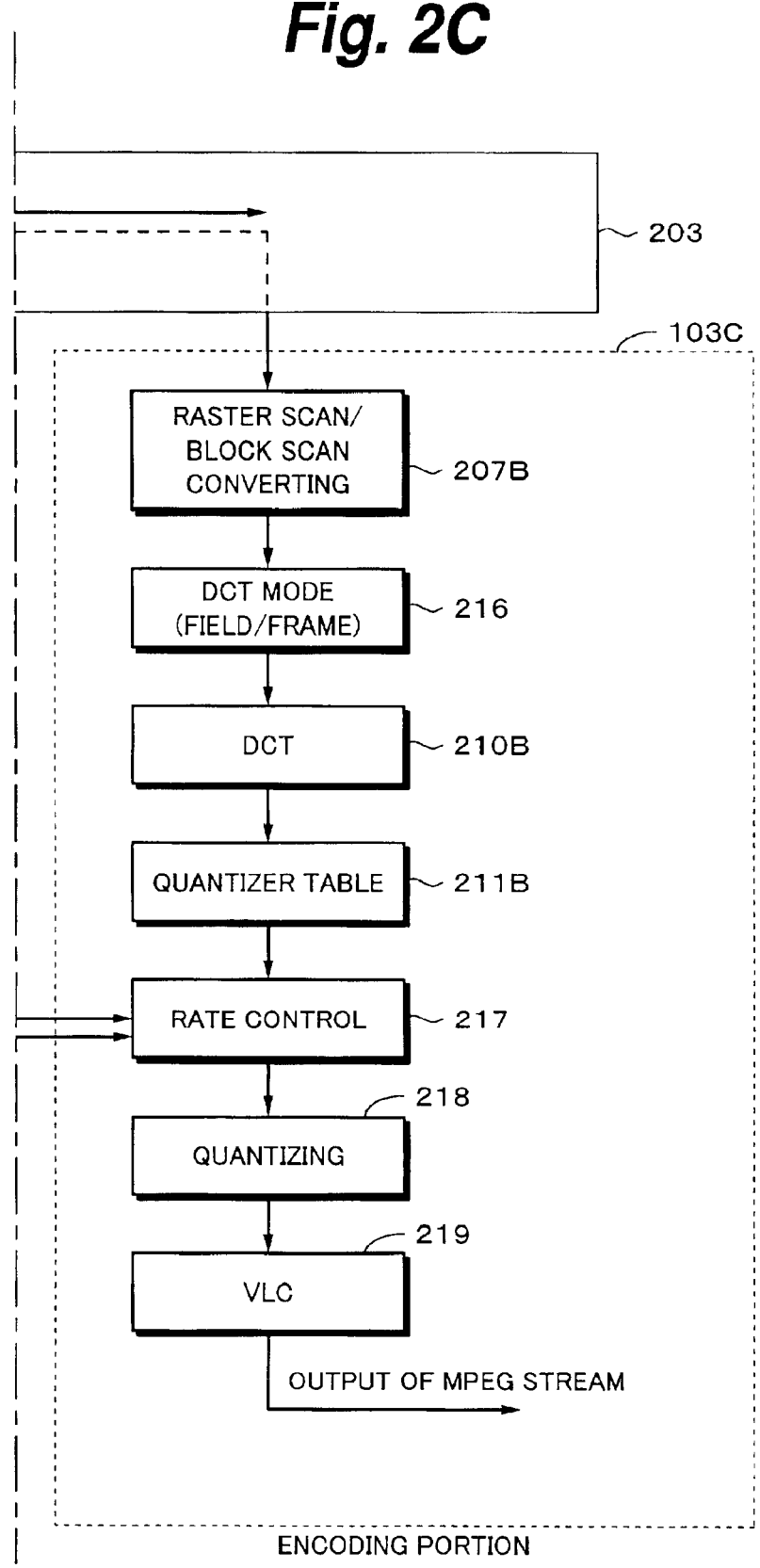

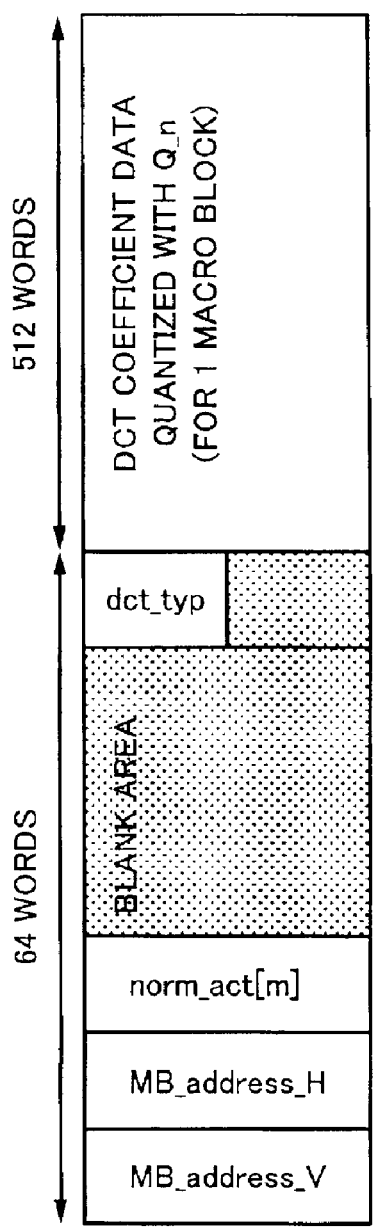
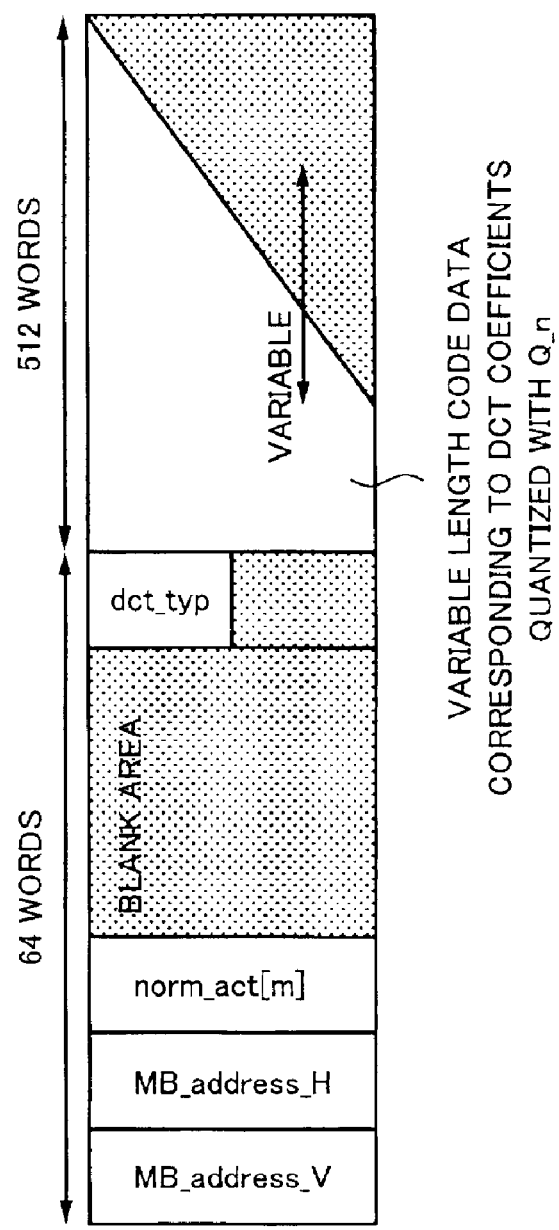
Fig. 5A
Fig. 5B

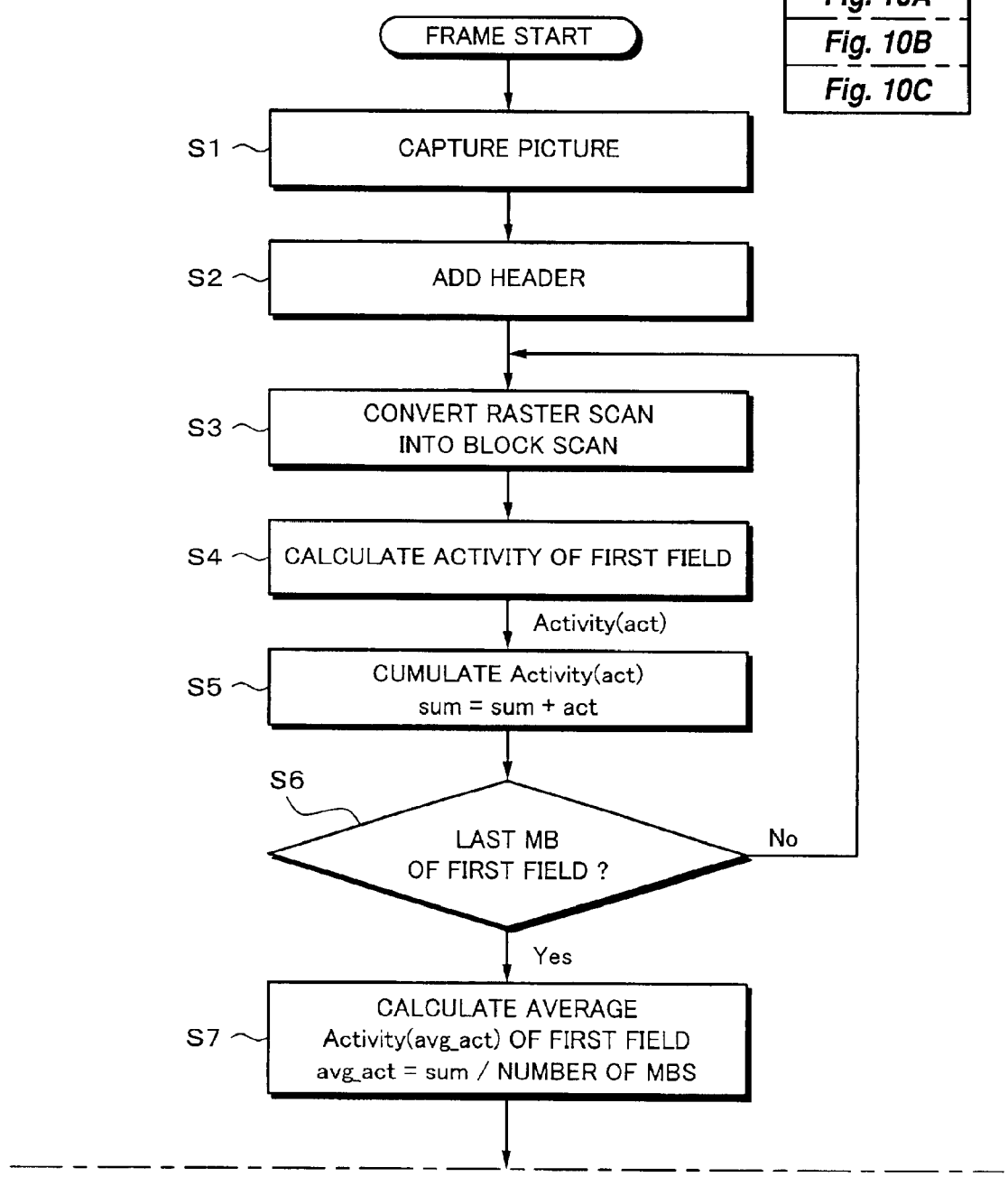

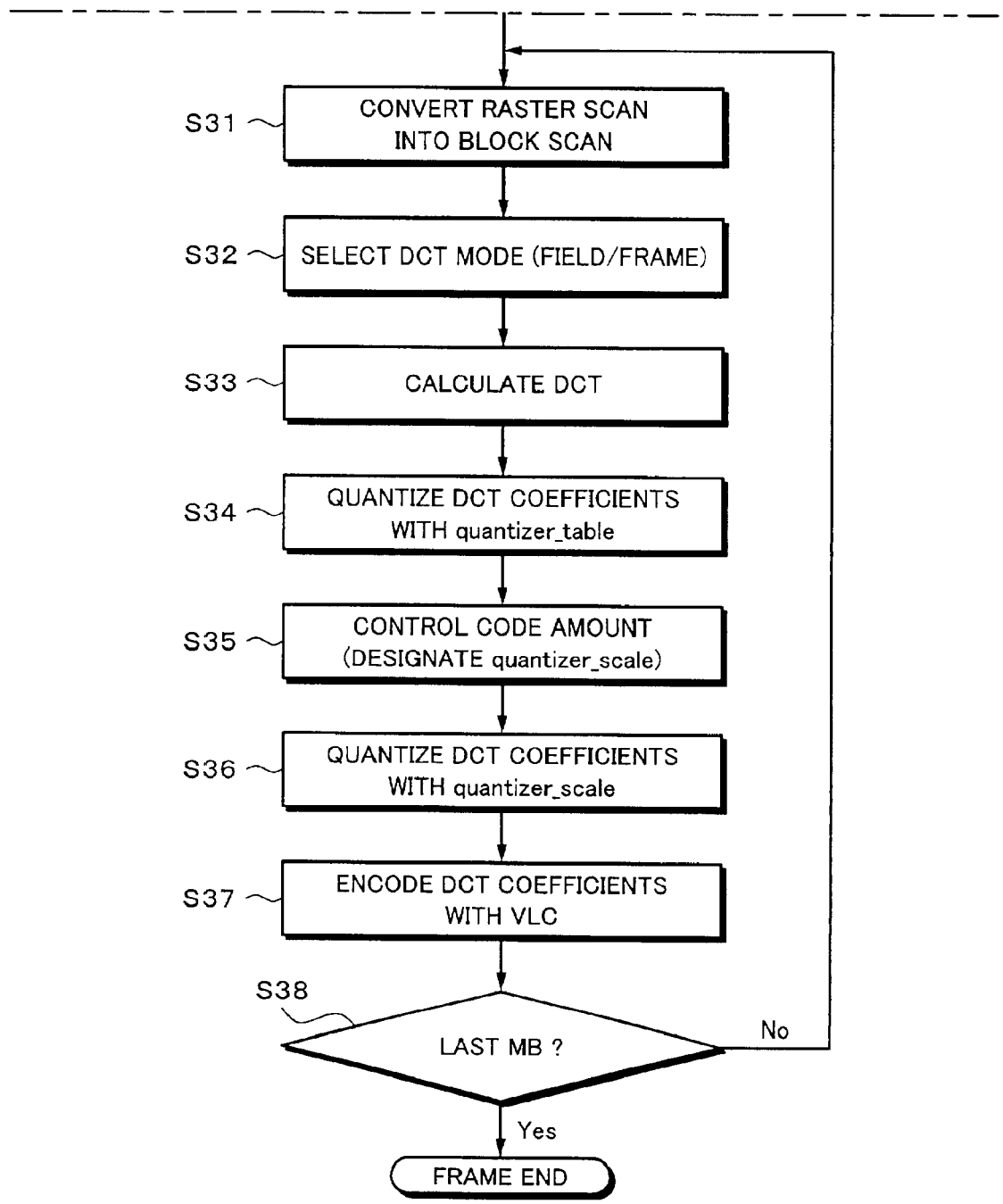

Fig. 11A

| DC | 47 | 10 | 11 |
|---|---|---|---|
| 62 | 28 | -11 | -5 |
| -27 | -11 | 3 | 2 |
| 30 | -3 | 2 | 1 |

Fig. 11B

| DC | 48 | 8 | 8 |
|---|---|---|---|
| 64 | 32 | -8 | -8 |
| -24 | -8 | 0 | 0 |
| 32 | 0 | 0 | 0 |

Fig. 11C

| DC | 6.86 | 1.14 | 1.14 |
|---|---|---|---|
| 9.14 | 4.57 | -1.14 | -1.14 |
| -3.43 | -1.14 | 0.00 | 0.00 |
| 4.57 | 0.00 | 0.00 | 0.00 |

FRACTIONAL PARTS ⇒

| DC | 0.14 | 0.14 | 0.14 |
|---|---|---|---|
| 0.14 | 0.43 | 0.14 | 0.14 |
| 0.43 | 0.14 | 0.00 | 0.00 |
| 0.43 | 0.00 | 0.00 | 0.00 |

Fraction(Q7) = 2.27

Fig. 11D

| DC | 6.00 | 1.00 | 1.00 |
|---|---|---|---|
| 8.00 | 4.00 | -1.00 | -1.00 |
| -3.00 | -1.00 | 0.00 | 0.00 |
| 4.00 | 0.00 | 0.00 | 0.00 |

FRACTIONAL PARTS ⇒

| DC | 0.00 | 0.00 | 0.00 |
|---|---|---|---|
| 0.00 | 0.00 | 0.00 | 0.00 |
| 0.00 | 0.00 | 0.00 | 0.00 |
| 0.00 | 0.00 | 0.00 | 0.00 |

Fraction(Q8) = 0.00

Fig. 11E

| DC | 4.80 | 0.80 | 0.80 |
|---|---|---|---|
| 6.40 | 3.20 | -0.80 | 0.80 |
| -2.40 | -0.80 | 0.00 | 0.00 |
| 3.20 | 0.00 | 0.00 | 0.00 |

FRACTIONAL PARTS ⇒

| DC | 0.20 | 0.20 | 0.20 |
|---|---|---|---|
| 0.40 | 0.20 | 0.20 | 0.20 |
| 0.40 | 0.20 | 0.00 | 0.00 |
| 0.20 | 0.00 | 0.00 | 0.00 |

Fraction(Q9) = 2.40   (quantizer_scale = 10)

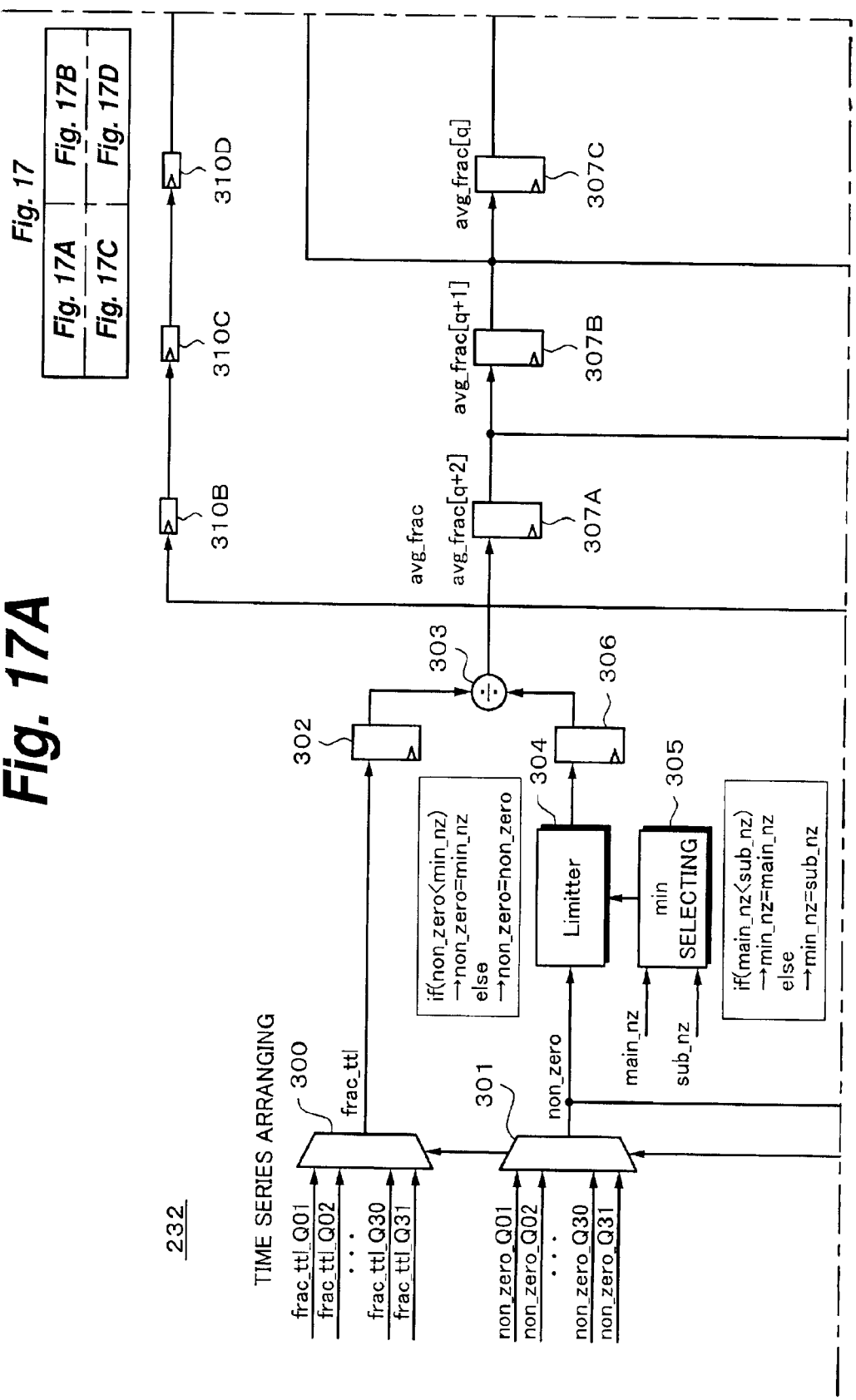

IMAGE PROCESSING APPARATUS

BACKGROUND OF THE INVENTION

1. Field of the Invention

The present invention relates to an image processing apparatus that quantizes video data corresponding to a quantizer scale.

2. Description of the Related Art

As typified by a digital VTR (Video Tape Recorder), a data recording and reproducing apparatus that records a digital video signal and a digital audio signal to a record medium and that reproduces them therefrom is known. Since the data capacity of a digital video signal is huge, it is normally compression-encoded and then recorded to a record medium. In recent years, the MPEG2 (Moving Picture Experts Group 2) is known as a standard compression encoding system.

In the MPEG2, data that has been obtained by both a predictively encoding process that uses a motion detecting method and the DCT (Discrete Cosine Transform) process is quantized and compression-encoded. In addition, using a variable length code encoding process, the compression efficiency is improved. In an broadcasting station and so forth, to easily edit data and maintain the picture quality thereof, normally, data is not compressed in the chronological direction using a motion detecting method. A digital video signal is block-segmented and each block is processed corresponding to the DCT process. Obtained DCT coefficients of each block are quantized with a quantizer scale value selected for each block.

When video data that has been compression-encoded in the forgoing manner is edited, the video data is temporarily decoded as base band video data. After the video data has been edited, the base band video data is compression-encoded in the same manner. The resultant video data is recorded to a record medium such as a magnetic tape. At that point, when the quantizer scale value used in the compression-encoding process performed before video data is edited is the same as the quantizer scale value used in the compression-encoding process performed after video data is edited, no problem will take place. In contrast, when the quantizer scale value used in the compression-encoding process performed before video data is edited is different from the quantizer scale value used in the compression-encoding process performed after video data is edited, the picture quality of the video data that has been edited will be worse than the picture quality of the video data that has not been edited.

To solve such a problem, an algorithm for preventing the picture quality of dubbed data from deteriorating has been proposed. In the algorithm, when video data that has been temporarily compression-encoded is reproduced and decoded for a non-shift dubbing process or the like and then compression-encoded and recorded to the record medium, a quantizer scale value used in the preceding encoding process is detected. Using the detected quantizer scale value, the decoded data is re-encoded. In the following description, the algorithm for detecting the preceding quantizer scale value is referred to as back search.

As an example of a structure that performs the back search, in a video tape recorder using an MPEG2 compressing system, when an MPEG encoder performs quantizing calculations at multiple steps corresponding to the MPEG2 to perform a pre-encoding process, by summing "remainders" of dividing operations of individual steps, the MPEG encoder determines the preceding quantizer scale value. This method has been proposed as Japanese Patent Laid-Open Publication No. Hei 6-319112.

In other words, when the pre-encoding process is performed, before the actual encoding process is performed, the code amount is estimated. At that point, as the quantizing calculations at multiple steps, data is quantized with each of quantizer scale values prescribed in the MPEG2. "Remainders" of dividing operations of the quantizing process are used.

When the back search is performed using "remainders" as a result of the quantizing process, depending on the calculating method used in the hardware, there is a case that a fractional part of the result of a dividing operation should be multiplied by a devisor. As a result, the calculating process becomes complicated.

In addition, when "remainder" is obtained by multiplying a divisor by a fractional part, the value of "remainder" is proportional to the value of a divisor. However, when the value of "remainder" becomes large, in consideration of a calculation accuracy, by comparing data with designated parameter values, it was able to be determined whether or not data is divisible.

OBJECTS AND SUMMARY OF THE INVENTION

Therefore, an object of the present invention is to provide an image processing apparatus that allows an quantizer scale value used in the preceding encoding process to be detected with high accuracy, a method thereof, and an image processing program.

To solve the forgoing problem, the present invention is an image processing apparatus, comprising a quantizing means for quantizing a video signal with a plurality of different quantizer scale values so as to obtain quantized values corresponding to each of the quantizer scale values, a counting means for counting the number of effective samples of the quantized values corresponding to each of the quantizer scale values so as to obtain the number of effective samples corresponding to each of the quantizer scale values, a cumulating means for cumulating fractional parts of the quantized values corresponding to each of the quantizer scale values so as to obtain a cumulated value corresponding to each of the quantizer scale values, and a back search means for detecting a quantizer scale value used in the preceding encoding process for the video signal using a cumulated value of quantized values whose number of effective samples exceeds a predetermined threshold from the plurality of different quantizer scale values.

In addition, the present invention is an image processing apparatus, comprising a quantizing means for quantizing a video signal with a plurality of different quantizer scale values so as to obtain quantized values corresponding to each of the quantizer scale values, a counting means for counting the number of effective samples of the quantized values corresponding to each of the quantizer scale values so as to obtain the number of effective samples corresponding to each of the quantizer scale values, a cumulating means for cumulating fractional parts of the quantized values corresponding to each of the quantizer scale values so as to obtain a cumulated value corresponding to each of the quantizer scale values, a normalizing means for normalizing a cumulated value corresponding to each of the quantizer scale values with a counted value corresponding thereto so as to obtain a normalized cumulated value, and a back search means for detecting a quantizer scale value used in the preceding encoding process for the video signal with the normalized cumulated value.

In addition, the present invention is an image processing apparatus, comprising a quantizing means for quantizing a video signal with a plurality of different quantizer scale values so as to obtain quantized values corresponding to each of the quantizer scale values, a cumulating means for cumulating fractional parts of the quantized values corresponding to each of the quantizer scale values so as to obtain a cumulated value corresponding to each of the quantizer scale values, and a back search means for detecting a quantizer scale value used in the preceding encoding process for the video signal with a first cumulated value cumulated by the cumulating means corresponding to a considered first quantizer scale value and second and third cumulated values cumulated by the cumulating means corresponding to second and third quantizer scale values represented by quantizer scale codes that are different from a quantizer scale code that represents the first quantizer scale value by 1.

In addition, the present invention is an image processing apparatus, comprising a quantizing means for quantizing a video signal with a plurality of different quantizer scale values so as to obtain quantized values corresponding to each of the quantizer scale values, a cumulating means for cumulating fractional parts of the quantized values corresponding to each of the quantizer scale values so as to obtain a cumulated value corresponding to each of the quantizer scale values, and a back search means for detecting a quantizer scale value used in the preceding encoding process for the video signal, the back search means being a combination of a first back search process using a first cumulated value cumulated by the cumulating means corresponding to a considered first quantizer scale value and second and third cumulated values cumulated by the cumulating means corresponding to second and third quantizer scale values represented by quantizer scale codes that are different from a quantizer scale code that represents the first quantizer scale value by 1, and a second back search process using the first cumulated value, the second cumulated value, the third cumulated value, and a fourth cumulated value cumulated by the cumulating means corresponding to a fourth quantizer scale code represented by a quantizer scale code that is different from the quantizer scale code that represents the first quantizer scale value by 2.

BRIEF DESCRIPTION OF THE DRAWINGS

FIGS. 1A and 1B are block diagrams showing the structure of an example of a digital VTR according to an embodiment of the present invention;

FIGS. 2A, 2B, and 2C are block diagrams showing the structure of an example of an MPEG encoder;

FIGS. 5A and 5B are schematic diagrams showing examples of the structure of a stream transferred in each portion of the MPEG encoder;

FIGS. 10A, 10B, and 10C are parts of a flow chart showing an example in the case that a process of the MPEG encoder is performed by software;

FIGS. 11A, 11B, 11C, 11D, and 11E are schematic diagrams showing an example of practical numeric values for explaining the theory of the back search;

FIGS. 17A, 17B, 17C, and 17D are parts of a block diagram showing the structure of an example of a back search detecting portion.

DETAILED DESCRIPTION OF THE PREFERRED EMBODIMENTS

Figure 1B:
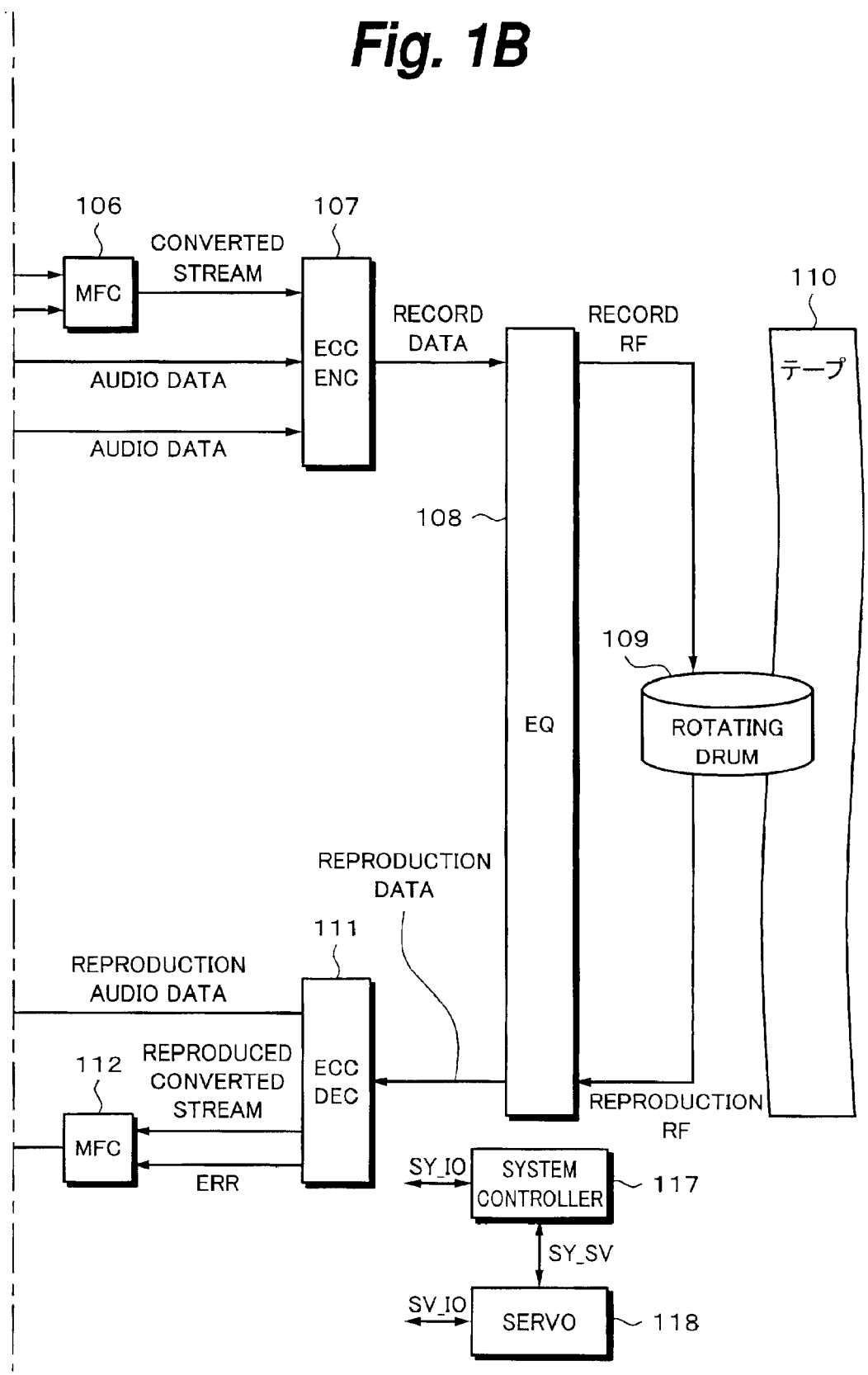

Next, embodiments of the present invention will be described. According to an embodiment of the present invention, with fractional parts that take place in a quantizing process of the MPEG2, a quantizer scale value of the preceding encoding process is detected. With the detected quantizer scale value, the current encoding process is performed. In other words, when a simple dubbing operation is performed, DCT coefficients are divisible by a quantizer scale value or a divisor thereof of the preceding encoding process. Thus, it is determined whether or not DCT coefficients are exactly divided by a quantizer scale value corresponding to a value of which fractional parts that take place in a quantizing process are cumulated. Corresponding to the determined result, a quantizer scale value of the preceding encoding process is detected. In the following description, an operation for detecting a quantizer scale value of the preceding encoding process is referred to as back search detection.

In addition, according to an embodiment of the present invention, to exclude the influence of the difference of the number of cumulated samples, the number of effective samples is counted. The cumulated value of fractional parts is normalized by dividing it by the number of effective samples. With the normalized cumulated value, the back search detection is performed.

In addition, according to an embodiment of the present invention, when it is determined whether or not DCT coefficients are exactly divided by a particular quantizer scale value corresponding to the cumulated value of fractional parts that take place in the quantizing process, the cumulated results of fractional parts that take place in the quantizing process with quantizer scale values represented by quantizer scale codes that are immediately preceded and immediately followed by (that are different by one from) the current quantizer scale code are also used.

In addition, the determination is performed with the cumulated results of fractional parts that take place in the quantizing process with quantizer scale values represented by quantizer scale codes that are different by two from the current quantizer scale code.

To improve the detecting accuracy, for each macro block composed of 16 pixels×16 lines, a quantizing process is performed for all AC coefficients (not DC coefficients) of all DCT blocks (eight pixels×eight lines) of Y/Cb/Cr. With the cumulated result of fractional parts that take place in the quantizing process, the determination is performed. When the chroma format is 4:2:2, since there are 63 AC coefficients×8 DCT blocks=504 AC coefficients, the determination is performed by cumulating fractional parts of 504 coefficients.

An embodiment that will be described in the following is a preferred embodiment of the present invention. Although various technically preferred limitations are made in the following embodiment, unless explicitly stated that they restrict the present invention, the scope of the present invention is not restricted by such limitations.

Next, an embodiment of the present invention will be described. FIGS. 1A and 1B show the structure of an example of a digital VTR according to the embodiment of the present invention. The digital VTR can directly record a digital video signal that has been compression-encoded corresponding to the MPEG system to a record medium.

First of all, the structure, process, and operation of a recording system of the digital VTR will be described. Two types of serial-digital interface signals that are an SDI (Serial Data Interface) signal and an SDTI (Serial Data Transport Interface) signal and an external reference signal REF as a control signal are input from the outside to the recording system.

The SDI is an interface defined by SMPTE. The SDI transmits a (4:2:2) component video signal, a digital audio signal, and additional data. The SDTI is an interface that transmits an MPEG elementary stream that is a stream of which a digital video signal has been compression-encoded corresponding to the MPEG system (hereinafter this MPEG elementary stream is referred to as MPEG ES). An ES is composed of 4:2:2 components. As was described above, an ES is a steam composed of only I pictures and has the relation of 1 GOP=1 picture. In an SDTI-CP (Content Package) format, an MPEG ES is divided into access units. In addition, an MPEG ES is packed in a packet corresponding to a frame. In the SDTI-CP, a sufficient transmission band (at 27 MHz or 36 MHz of a clock rate or at 270 Mbps or 360 Mbps of a stream bit rate) is used. In one frame period, an ES can be transmitted as a burst.

An SDI signal transmitted by the SDI is input to an SDI input portion 101. The SDI input portion 101 converts the input SDI signal as a serial signal into a parallel signal and outputs the parallel signal. In addition, the SDI input portion 101 extracts an input synchronous signal that is a input phase reference from the SDI signal and outputs the extracted input synchronous signal to a timing generator TG 102.

In addition, the SDI input portion 101 separates the converted parallel signal into a video signal and an audio signal. The separated video input signal and audio input signal are output to an MPEG encoder 103 and a delay circuit 104.

The timing generator TG 102 extracts a reference synchronous signal from the input external reference signal REF. The timing generator TG generates a timing signal necessary for the digital VTR in synchronization with a designated reference signal that is one of the reference synchronous signal and the input synchronous signal that is supplied from the SDI input portion 101 and supplies the generated timing signal as a timing pulse to each block.

The MPEG encoder 103 performs the DCT process for the input video input signal so as to transform it into coefficient data. Thereafter, the MPEG encoder 103 quantizes the coefficient data. Thereafter, the MPEG encoder 103 encodes the coefficient data with a variable length code (VLD). The variable length code encoded (VLC) data that is output from the MPEG encoder 103 is an elementary stream (ES) corresponding to the MPEG2. The output is supplied to one input terminal of a recording side multi-format converter (hereinafter referred to as recording side MFC).

According to the embodiment, the MPEG encoder 103 performs a back search for detecting a quantizer scale value of the preceding encoding process. With the quantizer scale value detected by the back search, the current encoding process is performed.

The delay circuit 104 functions as a delay line for matching the audio input signal as non-compressed data with a delay of a process of the MPEG encoder 103 for the video signal. The audio signal delayed by the delay circuit 104 is output to an ECC encoder 107. This is because in the digital VTR according to the embodiment, the audio signal is treated as a non-compressed signal.

The SDTI signal that is supplied from the outside and transmitted by the SDTI is input to an SDTI input portion 105. The SDTI input portion 105 detects the synchronization of the SDTI signal. The SDTI signal is temporarily stored in a buffer. An elementary stream is extracted from the SDTI signal. The extracted elementary stream is supplied to the other input terminal of a recording side MFC 106. The obtained synchronous signal is supplied to the forgoing timing generator TG 102 (not shown).

In addition, the SDTI input portion 105 extracts a digital audio signal from the input SDTI signal. The extracted digital audio signal is supplied to an ECC encoder 107.

In such a manner, the digital VTR according to the embodiment can directly input an MPEG ES independent from a base band video signal that is input from the SDI input portion 101.

The recording side MFC circuit 106 has a stream converter and a selector. The recording side MFC circuit 106 selects an MPEG ES supplied from the MPEG encoder 103 or an MPEG ES supplied from the SDTI input portion 105 and groups DCT coefficients of a plurality of DCT blocks that compose one macro block corresponding to each frequency component. The recording side MFC circuit 106 rearranges the DCT coefficients in the order of lower frequency components. Hereinafter, a stream of which coefficients of an MPEG ES have been rearranged is referred to as converted elementary stream. When an MPEG ES is rearranged, in a search reproducing operation, as many DC coefficients and low order AC coefficients as possible are obtained. As a result, they contribute to the improvement of the quality of a searched picture. The converted elementary stream is supplied to the ECC encoder 107.

A main memory (not shown) having a large storage capacity is connected to the ECC encoder 107. The ECC encoder 107 has a packing and shuffling portion, an audio outer code encoder, a video outer code encoder, an inner code encoder, an audio shuffling portion, a video shuffling portion, and so forth as internal devices. In addition, the ECC encoder 107 has a circuit that assigns an ID to each sync block and a circuit that adds a synchronous signal. According to a first embodiment, as an error correction code for a video signal and an audio signal, a product code is used.

The product code is composed of an outer code and an inner code. A video signal or an audio signal is encoded with an outer code and an inner code in the vertical direction and horizontal direction, respectively, of a two-dimensional matrix thereof. As a result, a data symbol is dually encoded. As an outer code and an inner code, Reed-Solomon code can be used.

The converted elementary stream that is output from the MFC circuit 106 is supplied to the ECC encoder 107. In addition, audio signals that are output from the SDTI input portion 105 and the delay circuit 104 are supplied to the ECC encoder 107. The ECC encoder 107 performs a shuffling process and an error correction code encoding process for the supplied converted elementary stream and audio signal, adds an ID and a synchronous signal to each sync block, and outputs the resultant data as record data.

The record data that is output from the ECC encoder 107 is converted into a record RF signal by an equalizer EQ 108 that contains a record amplifier. The record RF signal is supplied to a rotating drum 109 on which a rotating head is disposed in a predetermined manner. In reality, a plurality of magnetic heads having different azimuths for forming adjacent tracks are disposed on the rotating drum 109.

When necessary, a scrambling process may be performed for record data. When data is recorded, a digital modulation may be performed for the data that is recorded. In addition, partial response class 4 and Viterbi code may be used. The equalizer 108 contains both a recording side structure and a reproducing side structure.

Next, the structure, process, and operation of the reproducing system of the digital VTR will be described. When data is reproduced from the magnetic tape 110, the data is reproduced by the rotating drum 109. The reproduction signal is supplied to the reproducing side structure of the equalizer 108 that contains a reproducing amplifier and so forth. The equalizer 108 equalizes the reproduction signal and shapes the waveform thereof. When necessary, the equalizer 108 performs a digital modulating operation and a Viterbi decoding operation. An output of the equalizer 108 is supplied to an ECC decoder 111.

The ECC decoder 111 performs an inverse process of the forgoing ECC encoder 107. The ECC decoder 111 contains a large capacity main memory, an inner code decoder, an audio deshuffling portion, a video deshuffling portion, and an outer code decoder. In addition, for video data, the ECC decoder 111 contains a deshuffling and depacking portion and a data interpolating portion. Likewise, for audio data, the ECC decoder 111 contains an audio AUX separating portion and a data interpolating portion.

The ECC decoder 111 detects the synchronization of the reproduction data, detects a synchronous signal added at the beginning of a sync block, and extracts the sync block. Each sync block of the reproduction data is error-corrected with an inner code. Thereafter, an ID interpolating process is performed for each sync block. The reproduction data for which the ID interpolating process has been performed is separated into video data and audio data. A deshuffling process is performed for each of the video data and the audio data. As a result, the sequence of data that was shuffled when the data was recorded is restored to the original sequence. The deshuffled data is error-corrected with an outer code.

When data has an error the ECC decoder 111 cannot correct due to its error correcting capability, the ECC decoder 111 sets an error flag to the data. With respect to error of video data, the ECC decoder 111 outputs a signal ERR that represents data that contains an error.

Reproduction audio data that has been error-corrected is supplied to an SDTI output portion 115. In addition, the reproduction audio data is supplied to a delay circuit 114. The delayed reproduction audio data is supplied to an SDI output portion 116. The delay circuit 114 is disposed to absorb the delay of the video data in the process of an MPEG decoder 113 that will be described later.

On the other hand, video data that has been error-corrected is supplied as a reproduced converted elementary stream to a reproducing side MFC circuit 112. The forgoing signal ERR is also supplied to the reproducing side MFC 112. The reproducing side MFC 112 performs the inverse process of the forgoing recording side MFC 106. The reproducing side MFC 112 contains a stream converter. The stream converter performs the inverse process of the recording side stream converter. In other words, the stream converter rearranges DCT coefficients for each frequency component to those for each DCT block. Thus, the reproduction signal is converted into an elementary stream corresponding to the MPEG2. At that point, when the signal ERR is supplied from the ECC decoder 111, the corresponding data is substituted for a signal fully corresponding to the MPEG2. The resultant signal is output.

The MPEG ES that is output from the reproducing side MFC circuit 112 is supplied to the MPEG decoder 113 and the SDTI output portion 115. The MPEG decoder 113 decodes (restores) the supplied MPEG ES to the original non-compressed video signal. In other words, the MPEG decoder 113 performs an inversely quantizing process and an inverse DCT process for the supplied MPEG ES. The decoded video signal is supplied to the SDI output portion 116.

As was described above, audio data that has been separated from video data by the ECC decoder 111 is supplied to the SDI output portion 116 through the delay 114. The SDI output portion 116 maps the supplied video data and audio data to an SDI format and converts them into an SDI signal having a data structure of the SDI format. The SDI signal is output to the outside.

On the other hand, as was described above, audio data that had been separated from video data by the ECC decoder 111 has been supplied to the SDTI output portion 115. The SDTI output portion 115 maps video data and audio data as an elementary stream to an SDTI format and converts them into an SDTI signal having a data structure of an SDTI format. The SDTI signal is output to the outside.

A system controller 117 (abbreviated as syscon 117 in FIGS. 1A and 1B) is composed of for example a microcomputer. The system controller 117 communicates with each block using a signal SY_IO and controls the overall operation of the digital VTR. When switches and so forth disposed on an operation panel (not shown) are operated, corresponding control signals are supplied to the system controller 117. Corresponding to the control signals, the system controller 117 controls operations such as a recording operation, a recording operation, and so forth of the digital VTR.

A servo 118 communicates with the syscon, system controller, 117 using the signal SY_SV and controls the traveling of the magnetic tape 110 and the driving of the rotating drum 109 using the signal SV_IO.

FIGS. 2A, 2B, and 2C show the structure of an example of the forgoing MPEG encoder 103. Examples of the structure of a stream transferred in each portion shown in FIGS. 2A, 2B, and 2C are shown in FIGS. 3 to 9.

The MPEG encoder 103 is composed of an input field activity average processing portion 103A, a pre-encode processing portion 103B, and an encoding portion 103C. The input field activity average processing portion 103A obtains an average value of activities of input video data and supplies the obtained average value to the pre-encode processing portion 103B. With the average value of the activities, the pre-encode processing portion 103B estimates a generated code amount of the input video data that is quantized. Corresponding to the estimated result, while the encoding portion 103C is controlling the code amount, the encoding portion 103C actually quantizes the input video data, encodes the quantized video data with a variable length code, and outputs the resultant data as an MPEG ES.

Corresponding to a horizontal synchronous signal HD, a vertical synchronous signal VD, and a field synchronous signal FLD supplied from the timing generator TG 102 shown in FIGS. 1A and 1B, a timing generator TG 220 generates a timing signal required for the MPEG encoder 103 and outputs the generated timing signal thereto. A CPU I/F block 221 is an interface with the system controller 117 shown in FIGS. 1A and 1B. The operation of the MPEG encoder 103 is controlled with a control signal and data exchanged through the CPU I/F block 221.

First of all, a process performed by the input field activity average processing portion 103A will be described. Video data that is output from the SDI input portion 101 and that is input to the MPEG encoder 103 is supplied to an input portion 201. The video signal is converted into an interface so that it is suitably stored in a main memory 203. In addition, a parity check is performed for the video signal. The video data is output from the input portion 201 to a header creating portion 202. Using a vertical blanking region or the like, headers such as sequence_header, quantizer_matrix, and gop_header of the MPEG are created. The created headers are stored in the main memory 203. These headers are mainly designated by the CPU I/F block 221. In other than the vertical blanking region, the header creating portion 202 stores video data supplied from the input portion 201 to the main memory 203.

The main memory 203 is a frame memory for a picture. The main memory 203 rearranges video data and absorbs a system delay. Video data is rearranged by for example an address controller (not shown) in such a manner that the address controller controls a read address of the main memory 203. In FIGS. 2A, 2B, and 2C, 8 lines, 0.5 frame, and 1 frame described in the block of the main memory 203 represent read timings of the main memory 203 as delay values. They are properly controlled corresponding to a command issued by the timing generator TG 220.

A raster scan/block scan converting portion 204 extracts MPEG macro blocks from each line of the video data stored in the main memory 203 and supplies the extracted MPEG macro blocks to an activity portion 205 disposed downstream thereof. According to the embodiment of the present invention, since activities are calculated with only the first field, macro blocks that are output from the raster scan/block scan converting portion 204 are composed of video data of the first field.

Figure 3A:
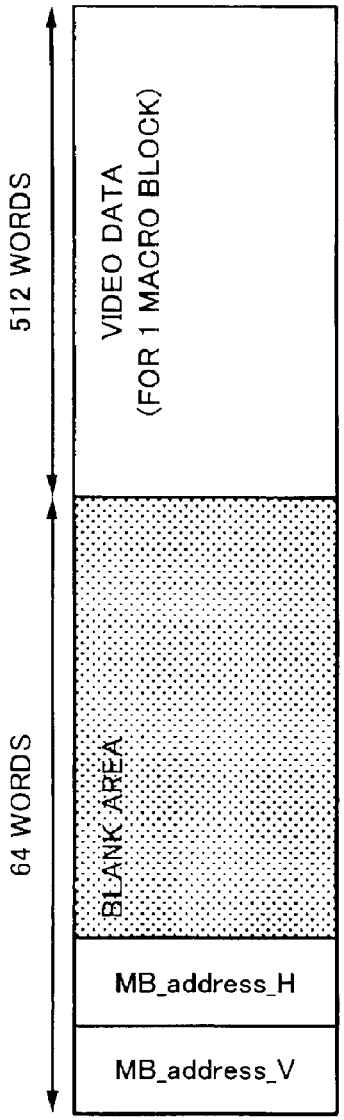
FIGS. 3A, 3B, and 3C are schematic diagrams showing examples of the structure of a stream transferred in each portion of the MPEG encoder.

As with an example shown in FIG. 3A, a stream that is output as output data from the raster scan/block scan converting portion 204 contains vertical address information of the current macro block, horizontal address information thereof, a blank area having a predetermined size, and video data for the current macro block in the order.

The stream has a data length of 576 words each of which is composed of eight bits. The last 512 words (referred to as data portion) is assigned as an area for storing video data for one macro block. The first 64 words (referred to as header portion) contains the forgoing address information of the current macro block and a blank area for data and flags embedded by each portion disposed downstream of the raster scan/block scan converting portion 204.

A macro block corresponding to the MPEG is a matrix of 16 pixels×16 lines. On the other hand, the input field activity average processing portion 103A performs a process for obtaining activities of only the first field. Thus, when up to eight lines of the first field are stored in the main memory 203, the process can be started. In reality, the process is started with a command issued by the timing generator TG 220.

The activity portion 205 calculates an activity of each macro block. The MPEG encoder 103 calculates activities of only the first field. The calculated result is output as a field activity signal field_act. The signal field_act is supplied to an averaging portion 206. The averaging portion 206 cumulates activities of one field and obtains an average value avg_act. The average value avg_act is supplied to an activity portion 209 of the pre-encode processing portion 103B that will be described later. The activity portion 209 performs an activity normalizing process for each macro block using the average value avg_act of the first field.

Thus, after the activity average value avg_act of the first field has been obtained, with the average value, a pre-encoding process can be performed while the quantizing process is adaptively performed.

Next, the pre-encode processing portion 103B will be described. A raster scan/block scan converting portion 207A basically performs the same process as the forgoing raster scan/block scan converting portion 204. However, since the raster scan/block scan converting portion 207A performs a pre-encoding process for estimating a code amount, the raster scan/block scan converting portion 207A requires video data of both the first field and the second field. Thus, when up to eight lines of the second field is stored in the main memory 203, the raster scan/block scan converting portion 207A can structure an MPEG macro block having a size of 16 pixels×16 lines. At that point, the process can be started. In reality, the process is started with a command issued by the timing generator TG 220.

Video data that is output from the raster scan/block scan converting portion 207A is supplied to a DCT mode portion 208. The DCT mode portion 208 selects a field DCT encoding mode or a frame DCT encoding mode to be performed.

Figure 3B:
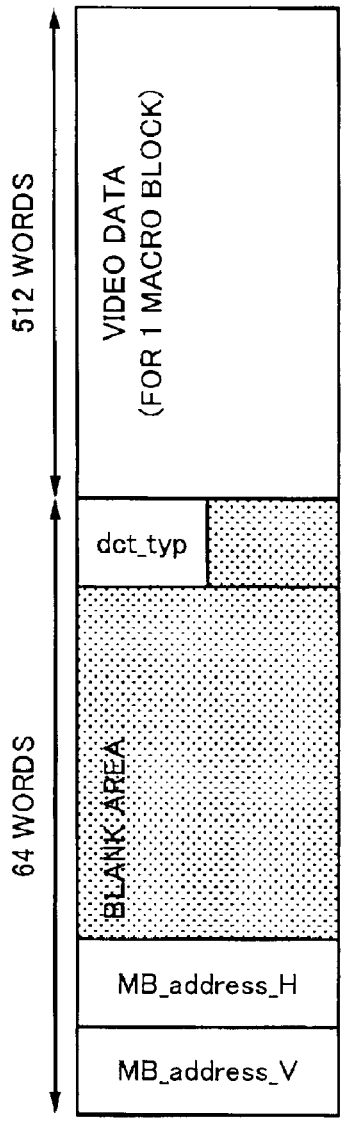

In this case, the encoding process is not actually performed. Instead, the sum of absolute values of difference values of pixels that are adjacent in the vertical direction is calculated in both the field DCT encoding mode and the frame DCT encoding mode. The sum obtained in the former is compared with the sum obtained in the latter. The encoding mode in which the smaller value is obtained is selected. The selected result is temporarily inserted as DCT mode type data dct_typ that is a flag in the stream. The flag is supplied to the later stages. As shown in FIG. 3B, the DCT mode type data dct_type is stored on the end side of the blank area of the header portion.

Figure 3C:
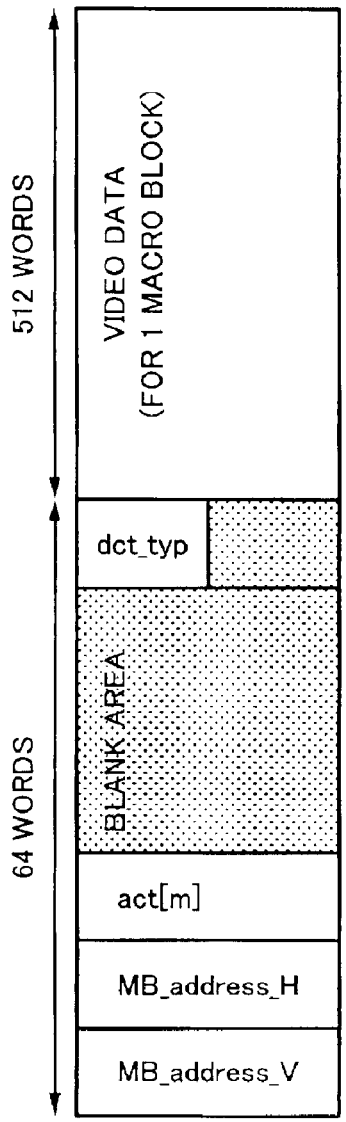

The activity portion 209 basically performs the same process as the forgoing activity portion 205. However, since the activity portion 209 performs a pre-encoding process, the activity portion 209 requires data of both the first field and the second field and calculates an activity of each macro block. The activity portion 209 obtains an activity act. As shown in FIG. 3C, the activity act is stored after the macro block address of the header portion. Next, with the activity act and the field activity average value avg_act obtained by the averaging portion 206, the activity portion 209 obtains a normalized activity Nact.

Figure 4A:
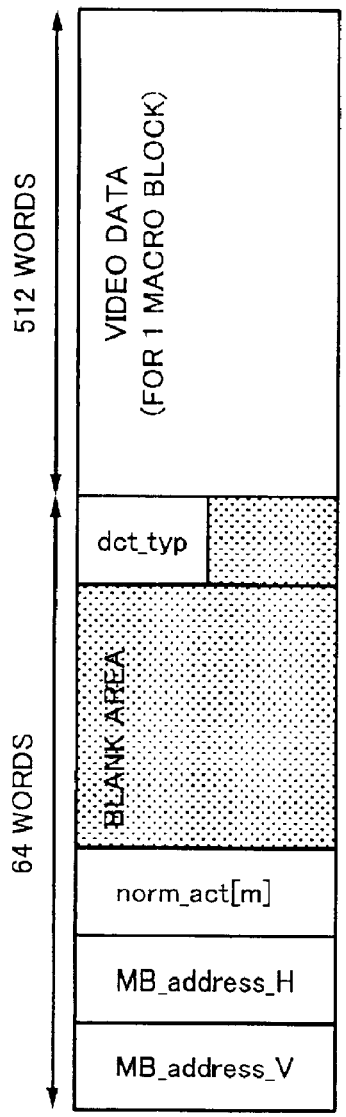
FIGS. 4A, 4B, and 4C are schematic diagrams showing examples of the structure of a stream transferred in each portion of the MPEG encoder.

As shown in FIG. 4A, the normalized activity Nact is temporarily inserted as normalized activity data norm_act that is a flag into the header portion of the stream. The flag is supplied to the later stages. In the stream, the forgoing activity act is overwritten with the normalized activity data norm_act.

Figure 4B:
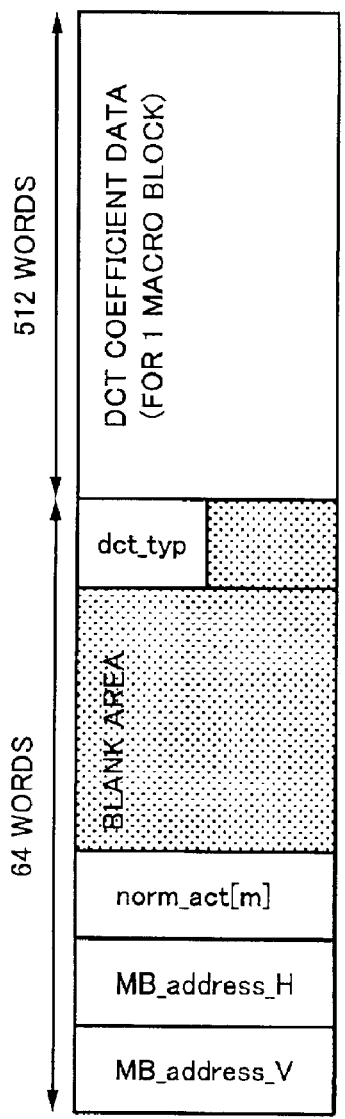

An output of the activity portion 209 is supplied to a DCT portion 210A. The DCT portion 210A divides the supplied macro block into DCT blocks each of which is composed of eight pixels×eight lines. The DCT portion 210A performs a two-dimensional DCT for each DCT block and generates DCT coefficients. As shown in FIG. 4B, the DCT coefficients are stored in the data portion of the stream and then supplied to a quantizer table portion 211A.

Figure 4C:
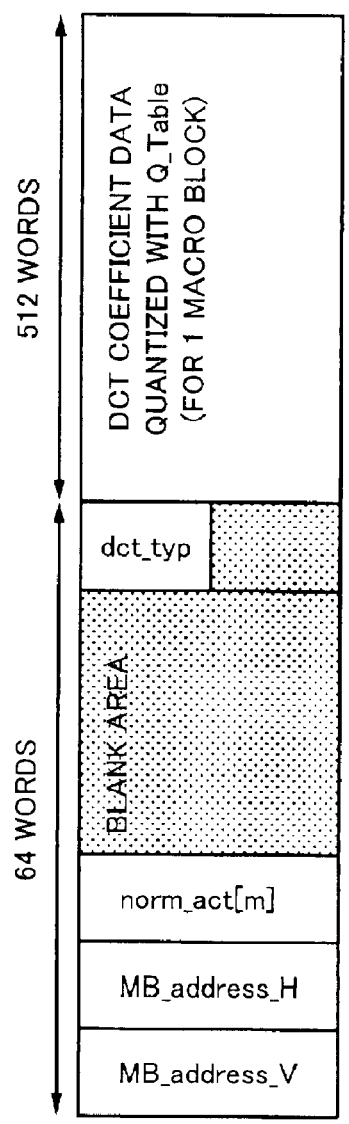

The quantizer table portion 211A quantizes DCT coefficients converted by the DCT portion 210A with a quantizer matrix (quantizer_matrix). As shown in FIG. 4C, DCT coefficients quantized by the quantizer table portion 211A are stored in the data portion of the stream and then output. An output of the quantizer table portion 211A is supplied to a multi-staged quantizing portion composed of a plurality of quantizing blocks 212, 212, . . . , a plurality of VLC portions 213, 213, . . . , a plurality of cumulating portions Σ 214, 214, . . . , and a plurality of cumulating portions Σ 215, 215, . . . DCT coefficients quantized by the quantizer table portion 211A are quantized by the multi-staged quantizing portion.

The quantizing blocks 212, 212, . . . quantize DCT coefficients with different quantizer scale (quantizer_scale) values Q. The quantizer scale values Q have been prescribed in for example the standard of the MPEG2. Corresponding to the standard, each of the quantizing blocks 212, 212, . . . is composed of n=31 quantizers. DCT coefficients are quantized with quantizer scales Qn assigned to the respective quantizing blocks 212, 212, . . . in a total of 31 steps. In the following description, the quantizer scale values of the Q_n portions 212, 212, . . . are denoted by quantizer scale values Qn.

The quantizing blocks 212, 212, . . . quantize DCT coefficients with respective quantizer scale values Qn. The quantized results of the quantizing blocks 212, 212, . . . are divided as integer parts and fractional parts and output. As shown in FIG. 5A, the integer parts are stored as DCT coefficients for quantizer scale values Qn in the data portion of the stream and supplied to the VLC portions 213, 213, . . . . The VLC portions 213, 213, . . . perform a scanning operation such as a zigzag scanning operation for DCT coefficients for the respective quantizer scales Qn, references a VLC table corresponding to the two-dimensional Huffman code, and encodes the resultant DCT coefficients with a variable length code.

As shown in FIG. 5B, data that has been encoded with a variable length code by the VLC portions 213, 213, . . . is stored in the data portion of the stream and then output. Outputs of the VLC portions 213, 213, . . . are supplied to the corresponding cumulating portions Σ 214, 214, . . . .

Figure 6A:
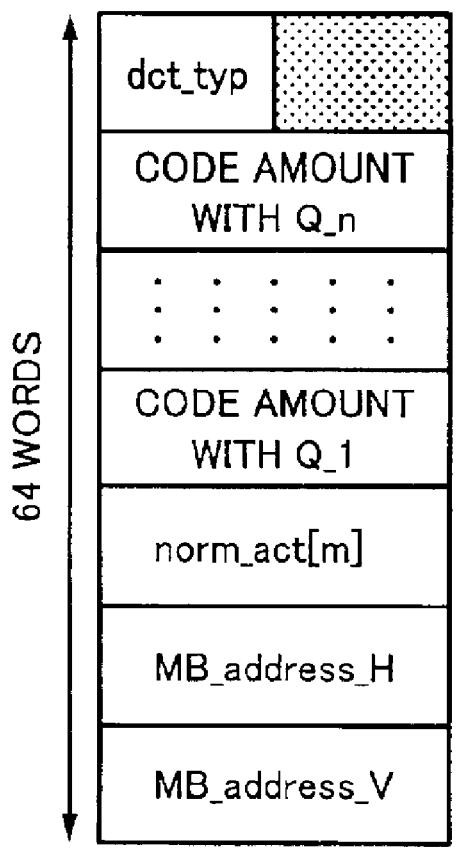
FIGS. 6A and 6B are schematic diagrams showing examples of the structure transferred in each portion of the MPEG encoder.

The cumulating portions Σ 214, 214, . . . each cumulate a generated code amount of each macro block. When 31 types of quantizers are used, 31 types of generated code amounts are obtained for each macro block. As shown in FIG. 6A, the generated code amounts cumulated by the cumulating portions Σ 214, 214, . . . are stored in the header portion of the stream. In other words, the generated code amounts quantized by the quantizing blocks 212, 212, . . . for each macro block are stored in the header portion of the stream. The data portion of the stream is deleted.

The stream in which the generated code amounts for each macro block have been embedded is supplied to the main memory 203 and then the encoding portion 103C that will be described later.

With the generated code amounts for each macro block that are output from the cumulating portions Σ 214, 214, . . . , an adaptive quantizing process is performed. In other words, with the normalized activity data norm_act obtained by the forgoing activity portion 209, mqaunt as a quantizer scale in consideration of a visual characteristic is obtained.

mqaunt=Q_n×norm_act

The cumulating portions Σ 215, 215, . . . each select a code amount corresponding to the generated code amount for each macro block in a quantizing process with quantizer_scale (=mquant) in consideration of a visual characteristic from generated code amounts for each macro block obtained by the cumulating portions Σ 214, 214, . . . and cumulates the code amounts for one frame.

Figure 6B:
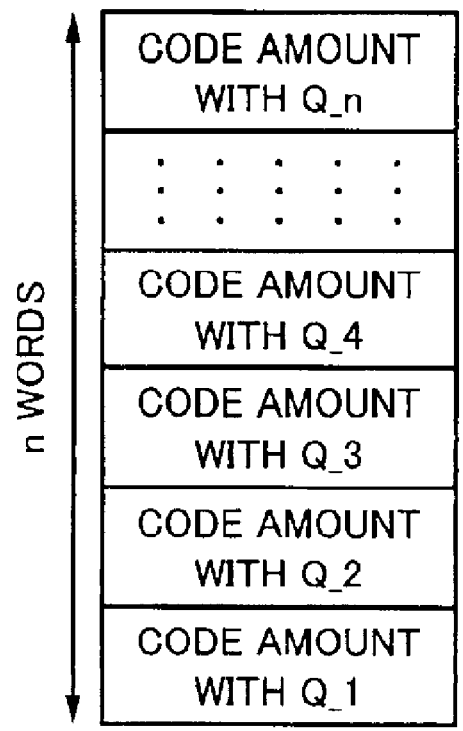

The values cumulated for one frame with the quantizer scale Qn by the cumulating portions Σ 215, 215, . . . are generated code amounts (frame data rates) of the frame. They are a stream of n words as shown in FIG. 6B. The stream in which the frame data rates are embedded is supplied to a rate controlling portion 217 that will be described later. When 31 types of quantizers are used, 31 types of generated code amounts are obtained for each frame.

A method for obtaining a generated code amount will be described in detail. For example, "a generated code amount of a frame by the cumulating portion Σ 215 corresponding to a Q_4 portion 212" is obtained as follows.

For example, when norm_act[1]=1.3 norm_act[2]=1.5 norm_act[3]=0.8 norm_act[4]=1.0, mqaunt[1]=4×1.3=5.2

: The generated code amount by the quantizing block 212 whose quantizer scale value Qn=5 is obtained from the header portion of the stream shown in FIG. 6A.

mqaunt[2]=4×1.5=6.0

: The generated code amount by the quantizing block 212 whose quantizer scale value Qn=6 is obtained from the header portion of the stream shown in FIG. 6A.

mqaunt[3]=4×0.8=3.2

: The generated code amount by the quantizing block 212 whose quantizer scale value Qn=3 is obtained from the header portion of the stream shown in FIG. 6A.

mqaunt[4]=4×1.0=4.0

: The generated code amount by the quantizing block 212 whose quantizer scale value Qn=4 is obtained from the header portion of the stream shown in FIG. 6A.

. . .

The generated code amounts for one frame are cumulated. This operation is performed by the cumulating portions Σ 215, 215, . . . corresponding to the Q_1 portion 212 to Q_n portion 212. As a result, generated code amounts for one frame are obtained.

The fractional parts that are output from the quantizing blocks 212, 212, . . . are supplied to a cumulating portion Σ

231. The cumulating portions Σ 231 are disposed corresponding to the quantizing blocks 212, 212, . . . (all the cumulating portions Σ 231 are not shown in FIGS. 2A, 2B, and 2C). The cumulating portions Σ 231 cumulate the fractional parts that are output from the quantizing blocks 212, 212, . . . . The cumulated values of the cumulating portions Σ 231 are supplied to a back search detecting portion 232.

Integer portions and decimal portions that are output from the quantizing blocks 212, 212, . . . are supplied to an significant sample counting portion 233 (abbreviated as "C" in FIGS. 2A, 2B, and 2C). Although all the significant sample counting portions 233 are not shown in FIGS. 2A, 2B, and 2C, they are disposed corresponding to the quantizing blocks 212, 212, . . . , respectively. The significant sample counting portions 233 count samples whose integer part and fractional part are not "0". The count values non_zero are supplied to the back search detecting portion 232.

FIGS. 2A, 2B, and 2C show that the back search detecting portion 232 is contained in the pre-encode processing portion 103B. In reality, the back search detecting portion 232 is disposed between the pre-encode processing portion 103B and the encoding portion 103C.

The back search detecting portion 232 detects quantizer scale values used in the preceding encoding process corresponding to the supplied cumulated values and the count values non_zero in a method that will be described later. In reality, quantized scale values Q detected by the back search detecting portion 232 are inserted as flags (not shown) into a blank area of the header portion of the stream and supplied to the later stages.

Next, the encode processing portion 103C will be described. The encode processing portion 103C performs a final encoding process. As was described above, the pre-encode processing portion 103B estimates generated code amounts for one frame in various encoding operations. The encode processing portion 103C performs an encoding process corresponding to the estimated generated code amounts for one frame so that the generated code amount does not exceed a designated target code amount and outputs the encoded data as an MPEG ES.

Although data used by the encode processing portion 103C has been stored in the main memory 203, as was described above, when generated code amounts for one frame have been estimated in various encoding operations of the pre-encode processing portion 103B, the encode processing portion 103C can start the encoding process. As was described above, the process of each portion of the encode processing portion 103C is properly started corresponding to a command issued by the timing generator TG 220.

Figure 7A:
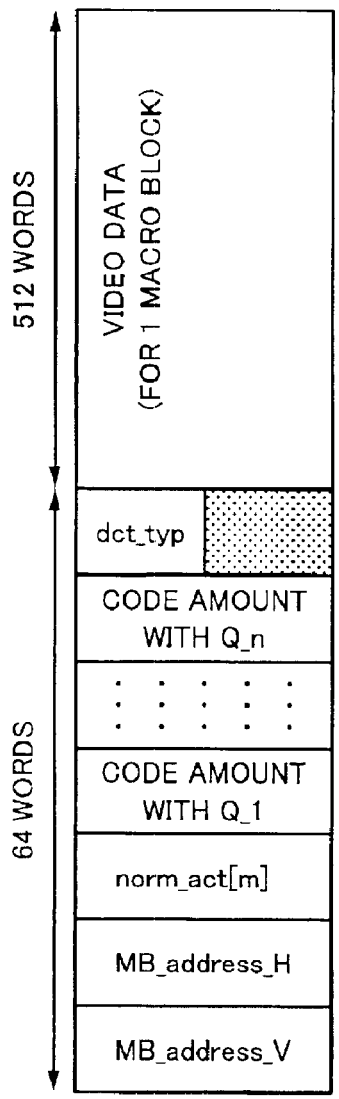
FIGS. 7A, 7B, and 7C are schematic diagrams showing examples of the structure transferred in each portion of the MPEG encoder.

A raster scan/block scan converting portion 207B processes video data that is read from the main memory 203 in the same manner as the raster scan/block scan converting portion 207A and extracts a macro block of 16 pixels×16 lines from the video data. As shown in FIG. 7A, the extracted macro block is stored in a data portion corresponding to the header portion shown in FIG. 6A and then supplied to a DCT mode portion 216.

Figure 7B:
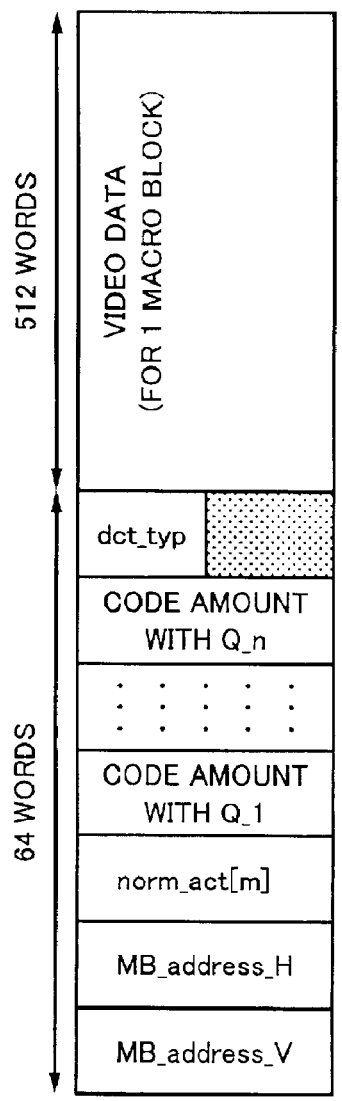

As with the forgoing DCT mode portion 208, the DCT mode portion 216 selects a field DCT encoding mode or a frame DCT encoding mode to be performed. At that point, the DCT mode portion 208 has selected an encoding mode. The selected result is temporarily inserted as DCT type data dct_typ into a stream (see FIG. 7A). The DCT mode portion 216 detects the DCT type data dct_typ from the stream and switches the encoding mode between the field encoding mode and the frame encoding mode corresponding to the detected DCT type data dct_typ. An output of the DCT mode portion 216 is shown in FIG. 7B.

Figure 7C:
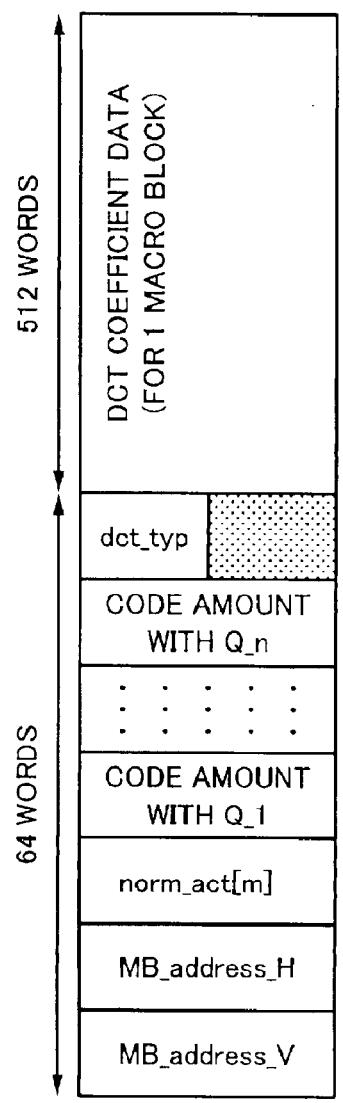

A macro block that is output from the DCT mode portion 216 is supplied to a DCT portion 210B. As with the forgoing DCT portion 210A, the DCT portion 210B performs a two-dimensional DCT process for each of DCT block composed of eight pixels×eight lines. The resultant DCT coefficients are stored in the data portion of the stream as shown in FIG. 7C and then output from the DCT portion 210B.

Figure 8A:
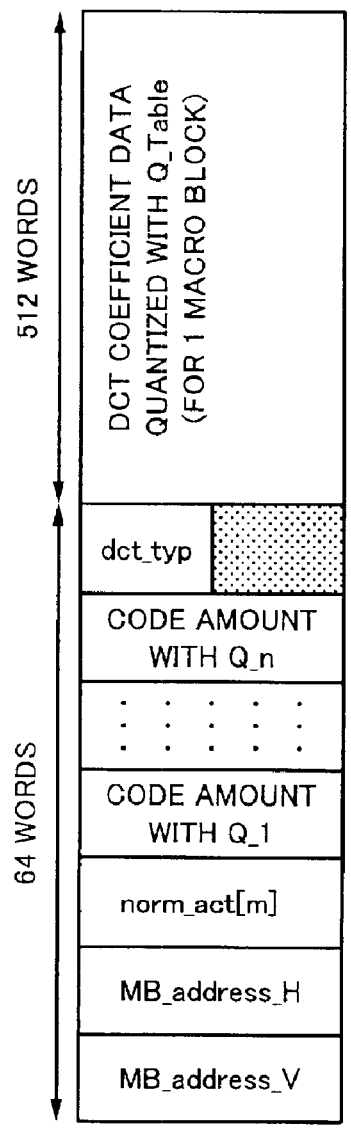
FIGS. 8A, 8B, and 8C are schematic diagrams showing examples of the structure transferred in each portion of the MPEG encoder.

A quantizer table portion 211B can be structured in the same manner as the quantizer table portion 211A. DCT coefficients generated by the DCT portion 210B are quantized with a quantizer matrix. The DCT coefficients quantized with the quantizer table portion 211B are stored in the data portion of the stream as shown in FIG. 8A and then supplied to the rate controlling portion 217.

The rate controlling portion 217 selects a frame data rate from those for quantizer scales Qn obtained by the cumulating portions Σ 215, 215, . . . of the pre-encode processing portion 103B so that the frame data rate does not exceed the maximum generated code amount per frame designated by the system controller 117 and is the closest thereto and obtains the quantized scale value Q corresponding to the selected frame data rate.

Figure 8B:
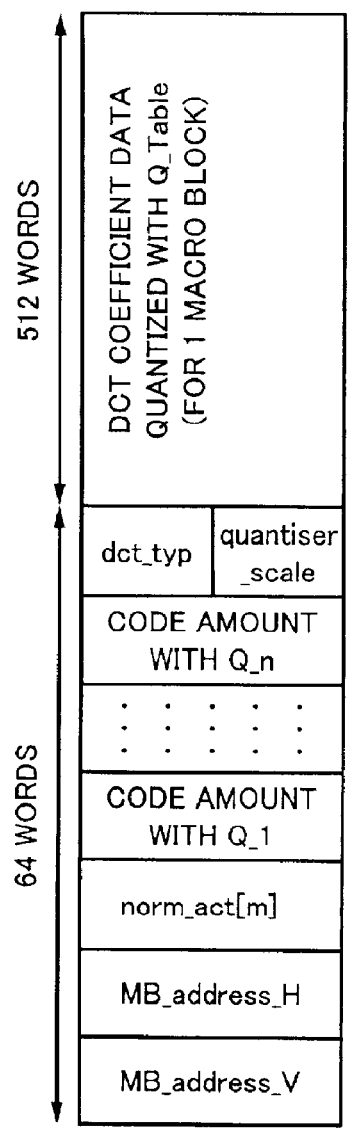
Figure 8C:
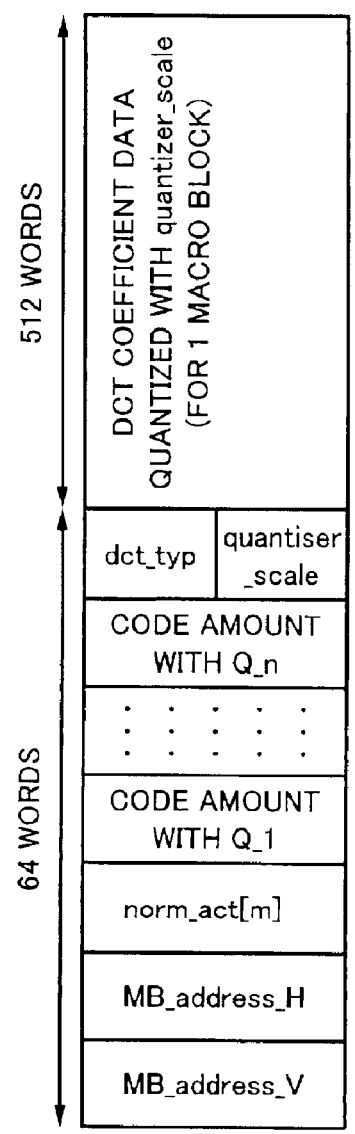

The rate controlling portion 217 obtains a quantizer scale value Q used in the real quantizing process corresponding to the quantizer scale value Q obtained by the code amount control, the quantizer scale value obtained by the back search of the back search detecting portion 232, and the remaining code amount. When the back search detecting portion 232 has not detected the quantizer scale value Q of the preceding encoding process, the quantizer scale value Q obtained by the code amount control is used in the real quantizing process. The obtained quantizer scale value Q for each macro block is stored as quantizer_scale on the end side of the header portion of the stream as shown in FIG. 8B and then supplied to a quantizing portion 218.

The remaining code amount is obtained by the rate controlling portion 217 with the maximum generated code amount (target code amount) per frame designated by the system controller 117 and supplied through the CPU I/F block 221 and the frame data rates for the quantizer scale values Qn supplied from the cumulating portions Σ 215, 215, . . . .

In addition, the quantizer scale (mquant) value for each macro block can be decreased by one size in the range that it does not exceed the difference between the maximum generated code amount per frame designated by the system controller 117 and supplied through the CPU I/F block 221 and the generated code amount per frame of the frame data rate selected by the rate controlling portion 217. Thus, the maximum generated code amount per frame designated by the system controller 117 and supplied through the CPU I/F block 221 can be nearly accomplished. As a result, a high picture quality can be accomplished.

The quantizing portion 218 extracts a quantizer scale (quantiases_scale) value designated in the forgoing manner by the rate controlling portion 217 from the stream and quantizes DCT coefficients quantized by the quantizer table portion 211B corresponding to the extracted quantizer scale value. At that point, the quantizer scale value supplied from the rate controlling portion 217 is a quantizer scale (mquant) value obtained from the normalized activity data norm_act. As a result, an adaptive quantization is performed in consideration of a visual characteristic.

DCT coefficients quantized by the quantizing portion 218 are stored in the data portion of the stream as shown in FIG.

8C and then supplied to a VLC portion 219. The DCT coefficients quantized and supplied to the VLC portion 219 are for example zigzag scanned. With reference to a VLC table corresponding to two-dimensional Huffman code, the DCT coefficients are encoded with a variable length code.

Figure 9:
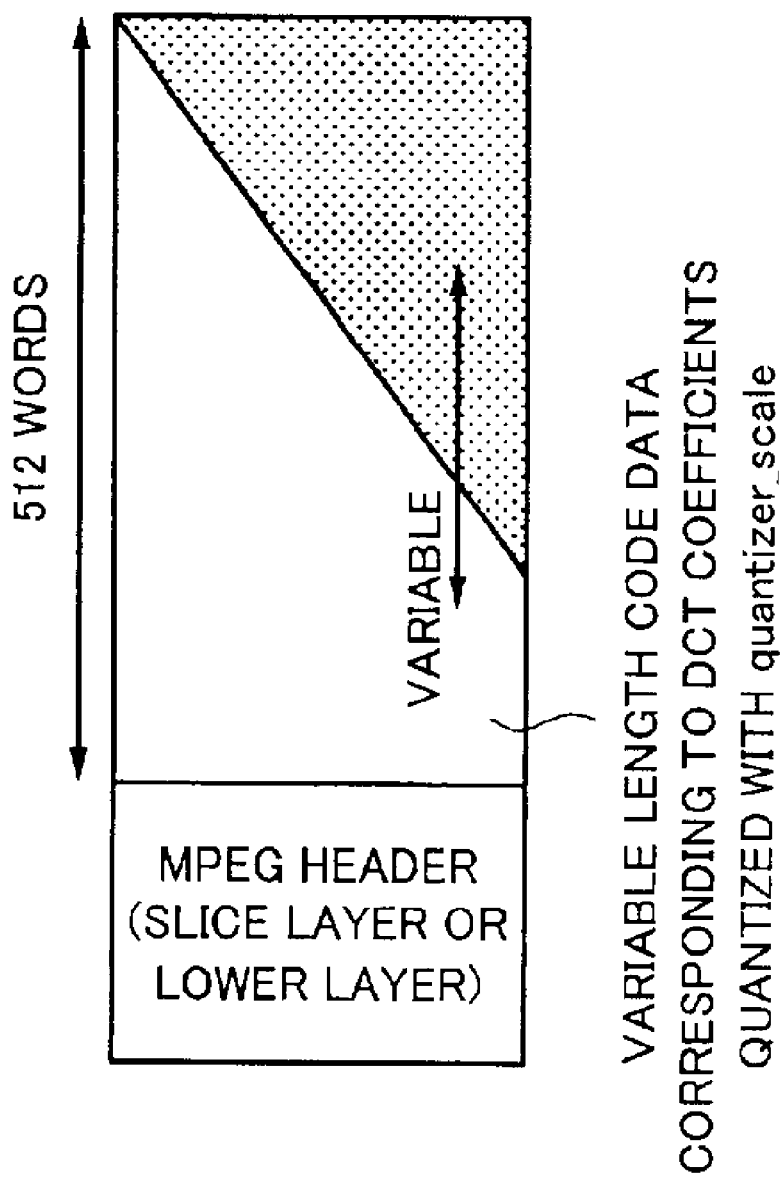
FIG. 9 is a schematic diagram showing an example of the structure transferred in each portion of the MPEG encoder.

At that point, the header portion that composes the first half portion of the stream in the VLC portion 219 is substituted with an MPEG header portion that stores MPEG header information of the slice layer or lower layer as shown in FIG. 9 and then the resultant stream is output. A variable length code is stored in the data portion on the second half side of the stream. In addition, the variable length code is bit-shifted so that it is byte-assigned and output as an MPEG ES.

In the forgoing example, the process of the MPEG encoder 103 is performed by hardware. However, the present invention is not limited to such an example. The process of the MPEG encoder 103 can be accomplished by software. For example, when a computer apparatus is provided with a video signal input interface, software that runs on the computer can execute the process using a CPU, a memory, and so forth. In addition, in the structure of the forgoing digital VTR, the MPEG encoder 103 may be substituted with a CPU and a memory.

Figure 10B:
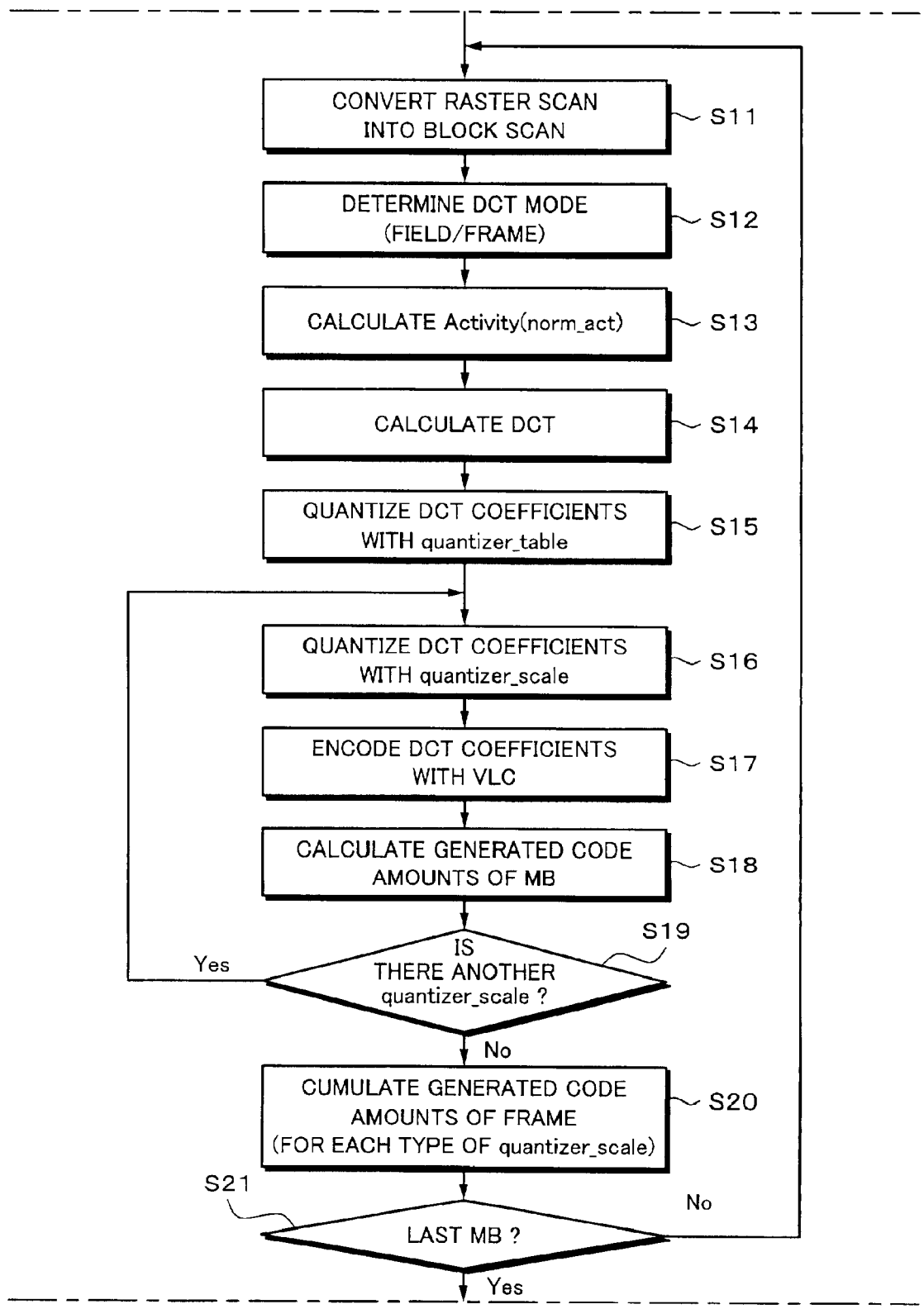

FIGS. 10A, 10B, and 10C are a flow chart showing an example of the case that the process of the MPEG encoder 103 is performed by software. Since the process shown in FIGS. 10A, 10B, and 10C is the same as the process of the hardware, the process of the software will be briefly described corresponding to the process of the hardware.

In the process shown in FIGS. 10A, 10B, and 10C, steps S1 to S7 correspond to the process of the forgoing input field activity average processing portion 103A. Steps S11 to S21 correspond to the process of the forgoing pre-encode processing portion 103B. Steps S31 to S38 correspond to the process of the forgoing encode processing portion 103C.

At the first step S1, video data is captured through the input interface. At the next step S2, in the vertical blanking region, each header of the MPEG is created from the captured video data and stored in a memory. In other than vertical blanking region, the captured video data is stored in the memory.

At step S3, the scanning mode for the video data is converted from a raster scanning mode into a block scanning mode. A macro block is extracted from the video data. This operation is performed by controlling read addresses of the memory for the video data. At step S4, the activity of the first field of the macro block extracted from the video data is calculated. At step S5, the activity Activity (act) as the calculated result is cumulated. The cumulated result as a cumulated value sum is stored in the memory. A loop from step S3 to step S5 is repeated until it is determined that the last macro block of the first field has been processed at step S6. In other words, the cumulated value sum is the sum of activities of macro blocks for one field.

When the determined result at step S6 represents that up to the last macro block of one field has been processed, the flow advances to step S7. At step S7, the cumulated value sum stored in the memory is divided by the number of macro blocks of one field. As a result, the average value Activity (avg_act) of the field activities of which activities of one field are averaged is obtained. The obtained average value Activity (avg_act) is stored in the memory.

After the average value Activity (avg_act) of the field activities has been obtained, the flow advances to step S11. As with step S3, at step S11, the scanning mode of the video data stored in the memory is converted from the raster scanning mode into the block scanning mode. A macro block is extracted from the video data.

At step S12, the field DCT encoding mode or the frame DCT encoding mode is selected for the DCT process. The selected result is stored as DCT mode type data dct_typ to the memory. At step S13, the activity of a macro block for both the first and second fields is calculated. With the average value Activity (avg_act) of field activities, which was obtained at step S7 and stored in the memory, a normalized activity Activity (norm_act) is obtained. The obtained normalized activity Activity (norm_act) is stored in the memory.

At step S14, the macro block extracted from the video data at step S11 is divided into DCT blocks each of which is composed of eight pixels×eight lines. The two-dimensional DCT process is performed for DCT blocks. At step S15, DCT coefficients into which DCT blocks have been transformed by the two-dimensional DCT process are quantized with an quantizer tale (quantizer_table). Thereafter, the flow advances to step S16.

A cycle from steps S16 to S19 is repeated for each quantizer scale (quantizer_scale) value Qn. As a result, processes equivalent to the forgoing Q_n portions 212, 212, . . . , VLC portions 213, 213 . . . , cumulating portions Σ 214, 214, . . . , and cumulating portions Σ 215, 215, . . . are performed. In other words, at step S16, DCT coefficients are quantized with the quantizer scale value Q=1.

When the quantizing process is performed at step S16, fractional parts are cumulated for each quantizer scale value Q. The cumulated fractional part for each quantizer scale value Q and for each macro block is stored in the memory.

After the DCT coefficients have been quantized at step S16, the flow advances to step S17. At step S17, with reference to a VLC table, the quantized DCT coefficients are encoded with a variable length code. At step S18, the generated code amount of the macro block encoded with the variable length code is calculated. The calculated generated code amount is stored in the memory. At step S19, it is determined whether or not there is the next quantizer scale value Q. When the determined result at step S19 represents that there is the next quantizer scale value, the flow returns to step S16. At step S16, the process is performed for the next quantizer scale value Q.

When the determined result at step S19 represents that the cumulated values of the generated code amounts of the macro block have been obtained for all the quantizer scale values Qn, the flow advances to step S20. At step S20, the generated code amounts of the macro block obtained at step S18 are cumulated for one frame. At that point, using a visual characteristic of the forgoing mquant, an adaptive quantization is performed. At step S21, it is determined whether or not up to the last macro block (MB) of one frame has been processed. When the determined result at step S21 represents that up to the last macro block has not been processed, the flow returns to step S11. In contrast, when up to the last macro block has been processed and the generated code amount for one frame has been estimated, the generated code amount for one frame in the adaptive quantization for each quantizer scale value Qn is stored in the memory. Thereafter, the flow advances to step S31. At step S31, a real encoding process is performed.

As with step S1, at step S31, the scanning mode for the video data stored in the memory is converted from the raster scanning mode into the block scanning mode. As a result, a macro block is extracted from the video data. At the next step S32, the DCT encoding mode is designated corresponding to the DCT mode type data dct_typ stored in the memory at step S12.

At step S33, the macro block that has been extracted from the video data at step S31 is divided into DCT blocks each of which is composed of eight pixels×eight lines. The two-dimensional DCT process is performed for the DCT blocks. At step S34, DCT coefficients into which the DCT blocks have been converted by the two-dimensional DCT process are quantized with a quantizer table (quantizer_table). Thereafter, the flow advances to step S35.

At step S35, corresponding to the generated code amount for one frame for each quantizer scale value Q estimated at steps S11 to S21, to control a code amount generated in the real encoding process, a quantizer scale value used at step S36 is designated for each macro block.

At that point, in the following manner, corresponding to fractional parts generated in the quantizing process for each quantizer scale value Q and for each macro block and stored in the memory at step S16, a back search detection is performed. When a quantizer scale value Q of the preceding encoding process is detected in the back search, corresponding to the quantizer scale value Q detected by the back search and the quantizer scale value Q obtained by the code amount control, a quantizer scale value Q used at step S36 is designated. In contrast, when a quantizer scale value Q used in the preceding encoding process has not been detected, the quantizer scale value Q obtained by the code amount control is designated as a quantizer scale value Q used at step S36.

At the next step S36, using the quantizer scale value Q designated at step S35, the DCT coefficients quantized with the quantizer table at step S34 are quantized.

At step S37, the DCT coefficients quantized at step S36 are encoded with a variable length code with reference to a VLC table. At step S38, it is determined whether or not up to the last macro block of one frame has been processed. When the determined result at step S38 represents that up to the last macro block for one frame has not been processed, the flow returns to step S31. At step S31, the quantizing process and the variable length code encoding process are performed for the next macro block. In contrast, when the determined result at step S38 represents that up to the last macro block for one frame has been processed, the encoding process for one frame has been completed.

In the forgoing example, the pre-encoding process of steps S11 to S21 and the encoding process of steps S31 to S38 are described as independent processes. However, the present invention is not limited to such an example. For instance, data obtained by estimating a generated code amount at steps S11 to S21 is stored in the memory. Data that is obtained in a real encoding process is selected from the data stored in the memory. As a result, the process of steps S31 to S38 can be contained as a loop in the process of steps S11 to S21.

Next, the theory of the back search will be described in brief. As was described above, in the back search according to the embodiment, using a characteristic of which a DCT coefficient that has been inversely quantized is a multiple of a quantizer scale value, a quantizer scale value used in the preceding encoding process is detected. FIGS. 11A, 11B, 11C, 11D, and 11E show practical numeric values as an example for explaining the theory of the back search. FIG. 11A shows DCT coefficients according to the embodiment. As was described above, real DCT coefficients have a format of eight pixels×eight lines. However, in this example, for simplicity, DCT coefficients that have a format of four pixels×four lines will be described.

FIG. 11B shows a result of which the DCT coefficients shown in FIG. 11A have been quantized with the quantizer scale value [8] in the preceding recording operation and the quantized DCT coefficients are inversely quantized in the reproducing operation. In this example, a top pixel (a pixel at the upper left end) is a DC component used in an MPEG data stream. The other 15 pixels are AC coefficients (63 AC coefficients in the format of eight pixels×eight lines).

Next, the case that such DCT coefficients are input and quantized will be described. First of all, the DCT coefficients shown in FIG. 11B are quantized with (divided by) the quantizer scale value [7] and the fractional parts of the ACT coefficients are cumulated. In the cumulating calculations shown in FIGS. 11A, 11B, 11C, 11D, and 11E, due to a problem of a calculation efficiency including the DCT process and an influence of the quantizing process of a quantizer matrix, after each fractional part is converted into an error to the closest integer and then cumulated.

As a result, when the DCT coefficients shown in FIG. 11B are quantized with (divided by) the quantizer scale value [7], values on the left of FIG. 11C are obtained. When the fractional parts of the AC coefficients are converted in the forgoing manner, values on the right of FIG. 11C are obtained. When these values are cumulated, the cumulated value fraction becomes [2.27].

When the DCT coefficients shown in FIG. 11B are quantized with (divided by) the quantizer scale value [8] and the fractional parts of the AC coefficients are converted in the forgoing manner, values shown in FIG. 11D are obtained. The cumulated value fraction of the obtained values shown in FIG. 11D becomes [0].

When the DCT coefficients shown in FIG. 11B are quantized with (divided by) the quantizer scale value [10] and the fractional parts of the AC coefficients are converted in the forgoing manner, values shown in FIG. 11E are obtained. The cumulated value fraction of the obtained values shown in FIG. 11E [2.40].

When an quantizing process is performed with the quantizer scale value [8] in the preceding encoding process, the cumulated value of the fractional parts of the AC coefficients becomes [0]. Thus, when this value is measured, the preceding quantizer scale value can be determined.

Figure 12:
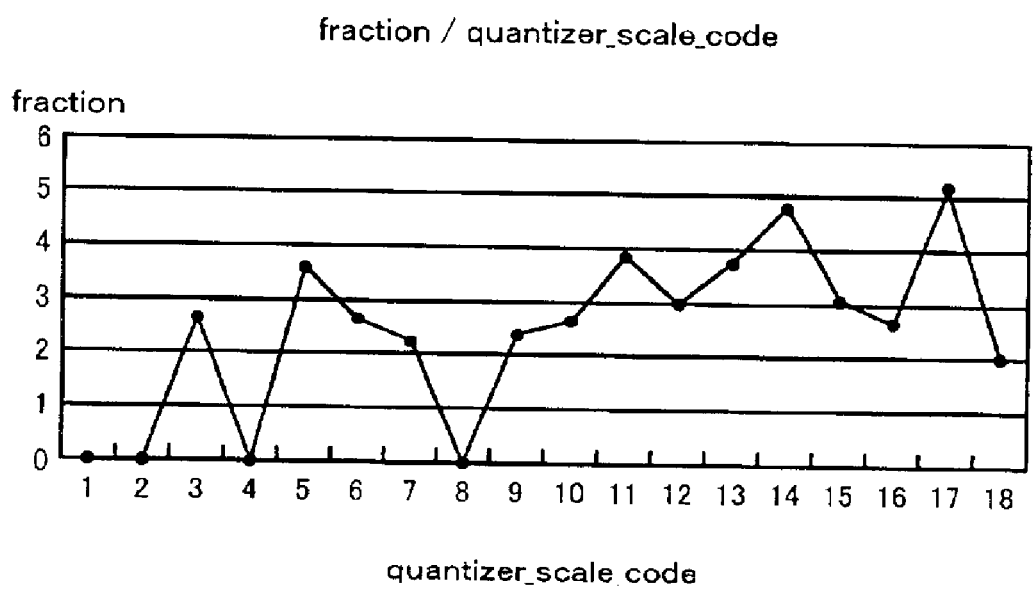
FIG. 12 is a schematic diagram showing the result of an example of a cumulated value of fractional parts in a quantizing process.

FIG. 12 shows examples of cumulated values in the forgoing calculation. In FIG. 12, the vertical axis represents a cumulated value fraction of fractional parts, whereas the horizontal axis represents quantizer scale codes (quantizer_scale_code) assigned to the quantizer scale values Q. In the example shown in FIGS. 11A, 11B, 11C, 11D, and 11E, when a quantizing process is performed with the quantizer scale value [8] in the preceding encoding process, the cumulated value fraction is [0]. In this case, as shown in FIG. 3, when the quantizer scale values are [1], [2], and [4], which are divisors of [8], their cumulated value is [0].

In other words, in the example, it can be said that the quantizer scale values Q represented by the quantizer scale codes [1], [2], and [4] are candidates of the quantizer scale value in the preceding encoding process.

When there are a plurality of quantizer scale values with which the cumulated value fraction becomes [0], it is determined that the largest quantizer scale value (in this example, [8]) is the quantizer scale value in the preceding encoding process.

The cumulated value fraction theoretically becomes [0]. In a real calculation, since the calculation precision length is limited, the cumulated value fraction contains an error. Thus, the cumulated value fraction does not accurately become [0]. Thus, the back search detection is performed by determining whether or not the cumulated value fraction is smaller than a predetermined threshold, not determining whether or not the cumulated value fraction is [0].

In other words, when the cumulated value fraction is smaller than the predetermined threshold value, it is assumed that the cumulated value fraction is [0] and that the DCT coefficients can be exactly divided by the quantizer scale value Q corresponding to the cumulated value fraction.

In this case, since various cumulated values fraction are calculated, if a fixed threshold is used, there is a possibility of which the determination cannot be effectively performed. When a small value is used as the threshold, cumulated values fraction that are apart from [0] can be excluded. As a result, a quantizer scale value can be prevented from being incorrectly detected. However, in this case, a quantized scale value to be detected tends to be excluded. In contrast, when a large value is used as the threshold, although more quantizer scale values are detected, a quantizer scale value not be detected tends to be incorrectly detected. In addition, to accurately determine the cumulated value fraction with a fixed threshold, a higher calculation accuracy is required.

From the above-mentioned point of view, according to the embodiment of the present invention, samples that have been used to calculate the cumulated value fraction and that have significant values are counted as effective samples. With the number of effective samples, the cumulated value fraction is normalized. In addition, with the relation between the normalized value of the cumulated value fraction (hereinafter referred to as normalized cumulated value) and the normalized cumulated values corresponding to quantizer scale values Q represented by quantizer scale codes that are immediately preceded and immediately followed by (that are different by [1] from) the current quantizer scale value Q, the back search detection is performed.

Next, the back search detecting method according to the embodiment of the present invention will be described in detail.

Figure 13:
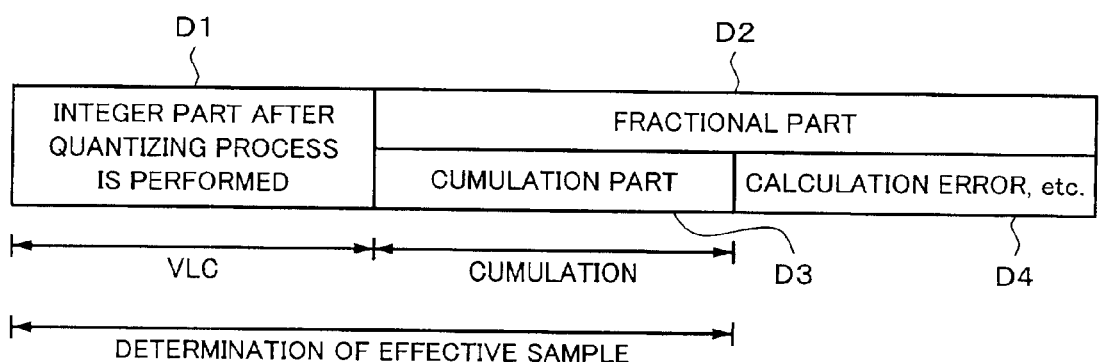
FIG. 13 is a schematic diagram showing the structure of an example of data quantized by a quantizing block.

The counting of effective samples and the normalization of the cumulated value fraction corresponding to the counted number of effective samples will be described. FIG. 13 shows the structure of an example of data quantized by the quantizing block 212. The quantized data is composed of an integer part D1 and a fractional part D2. The integer part D1 is supplied to the VLC portion 213. The fractional part D2 contains a part D4 that is smaller than a predetermined digit such as a calculation error. A part D3 that is larger than the predetermined digit (hereinafter, the part D3 is referred to as cumulation part D3) is cumulated by the cumulating portion Σ 231. The part D4 is a value smaller than a value to be cumulated by the cumulating portion Σ 231. The part D4 is a value smaller than an error accuracy of for example an quantizing calculation.

When the integer part D1 and the cumulation part D3 of the fractional part D2 are both [0], it can be determined that since the DCT coefficient that has not been quantized is [0] or the DCT coefficient is divided by a large quantizer scale value Q in the quantizing process, the data becomes a value smaller than the error accuracy in the quantizing process. Thus, when both the integer part D1 and the cumulation part D3 are [0], the data is not counted as a significant sample. In addition, unless at least one of the integer part D1 and the cumulation part D3 is [0], the data is counted as a significant sample.

The cumulated value fraction of which the cumulation parts D3 are cumulated for one macro block (namely, 63 AC coefficients×8 DCT blocks=504 AC coefficients are cumulated) is divided by (normalized with) the number of effective samples of which effective samples for one macro block are counted. With the normalized cumulated value of which the cumulated value fraction is normalized, the back search detection is performed.

Next, the counting of effective samples and the normalization of the cumulated value fraction using the number of significant sample in the case that a quantizing process has been performed with a particular quantizer scale value quantizer_scale will be described using the following programming list. The following list is a programming list written in C language for a computer apparatus and so forth. In the following programming list, a numeric value+":" at the beginning of each line represent a line number with which the corresponding step is described.

```
1:  for (i = 0; i <= 7; i++) {
2:      for (j = 1; j <= 63; j++) {
3:          quantized_dct_coeff = dct_coeff/quantizer_scale;
4:          fraction = abs(quantized_dct_coeff - int(quantized_dct_coeff));
5:          if (fraction >= 0.5) fraction = 1.0 - fraction;
6:          frac_ttl += fraction;
7:          if (quantized_dct_coeff != 0.0) non_zero++;
8:      }
9:  }
10: if (main_nz < sub_nz)    min_nz = main_nz;
11: else                     min_nz = sub_nz;
12: if (non_zero < min_nz)   non_zero = min_nz;
13: avg_frac = frac_ttl / non_zero;
```

Line 1 represents that the number of DCT blocks that compose a macro block is designated. In this example, since the chroma format is 4:2:2, one macro block is composed of eight DCT blocks that are Y1, Y2, Y3, Y4, Cb1, Cr1, Cb2, and Cr2. Line 2 represents that the number of DCT coefficients of each DCT block is designated. In this example, the number of DCT coefficients is 63 AC coefficients excluding a DC coefficient. Thus, a loop from line 3 to line 7 is repeated for each DCT block and for each AC coefficient (63 coefficients×eight blocks).

Line 3 represents that the DCT coefficient dct_coeff is divided by (quantized with) the quantizer scale value quantizer_scale. As a result, the quantized DCT coefficient quantized_dct_coeff is obtained. Line 4 represents that the integer part is subtracted from the quantized DCT coefficient quantized_dct_coeff. The absolute value of the subtracted result is obtained. As a result, the fractional part fraction of the quantized DCT coefficient quantized_dct_coeff is obtained. Line 5 represents that when the fractional part fraction is larger than [0.5], an error with the closest integer value is obtained. The obtained value becomes a new fractional part fraction. Line 6 represents that the new fractional part fraction is cumulated to the cumulated value frac_ttl. In this example, the fractional part fraction and the cumulated value fraction are distinguished. The forgoing cumulated value fraction corresponds to the cumulated value frac_ttl.

Line 7 represents that it is determined whether both the integer part and the fractional part of the quantized DCT coefficient quantized_dct_coeff are not [0]. When the determined result represents that both of them are not [0], the number of effective samples non_zero is counted up by 1.

Lines 10 to 13 represent that after the forgoing process has been completed for one macro block (namely, 504 AC coefficients), with the number of effective samples non_zero, the cumulated value frac_ttl is normalized. When the number of effective samples non_zero is a very small value, the cumulated value frac_ttl cannot be correctly normalized. Thus, when the number of effective samples non_zero is smaller than a predetermined value, the value of the number of effective samples non_zero is restructured.

Lines 10 and 11 represent that corresponding to lower limit values main_nz and sub_nz of the numbers of effective samples of the main back search and the sub back search that will be described later, the limit value min_nz is designated to the lower limit value main_nz or sub_nz that is smaller. The values main_nz and sub_nz are pre-designated parameters. Line 12 represents that the limit value min_nz and the number of effective samples non_zero are compared. When the number of effective samples non_zero is smaller than the limit value min_nz, the number of effective samples non_zero is limited to the limit value min_nz. Line 13 represents that the cumulated value frac_ttl is divided by the number of effective samples non_zero. As a result, a normalized cumulated value avg_frac of which the cumulated value fract_ttl is normalized with the number of effective samples non_zero is obtained.

Next, the back search detection corresponding to the normalized cumulated value avg_frac will be described. The normalized cumulated values avg_frac for all the quantizer scale values Q are obtained. As was described above, according to the embodiment of the present invention, corresponding to the normalized cumulated values avg_frac for all the quantizer scale values Q, the back search detection is performed using the following two methods.

In the first method, with two normalized cumulated values avg_frac corresponding to quantizer scale values Q represented by a quantizer scale code (q+1) and a quantizer scale code (q−1) that are larger by 1 and smaller by 1 than a quantizer scale code q that represents a quantizer scale value Q corresponding to a considered normalized cumulated value avg_frac, the back search is performed.

In other words, using normalized cumulated values avg_frac[q+1] and avg_frac[q−1] corresponding to quantizer scale values represented by a quantizer scale code (q+1) and a quantizer scale code (q−1) that are larger by 1 and smaller by 1 than a quantizer scale code q that represents a quantizer scale value Q, the back search is performed. Hereinafter, the back search in the first method is referred to as main back search.

In addition to the normalized cumulated values in the first method, in the second method, a back search is performed using a normalized cumulated value avg_frac[q+2] corresponding to a quantizer scale value represented by a quantizer scale code (q+2) that is larger than the quantizer scale code (q+1) by 1. Hereinafter, the back search in the second method is referred to as sub back search.

Figure 14:
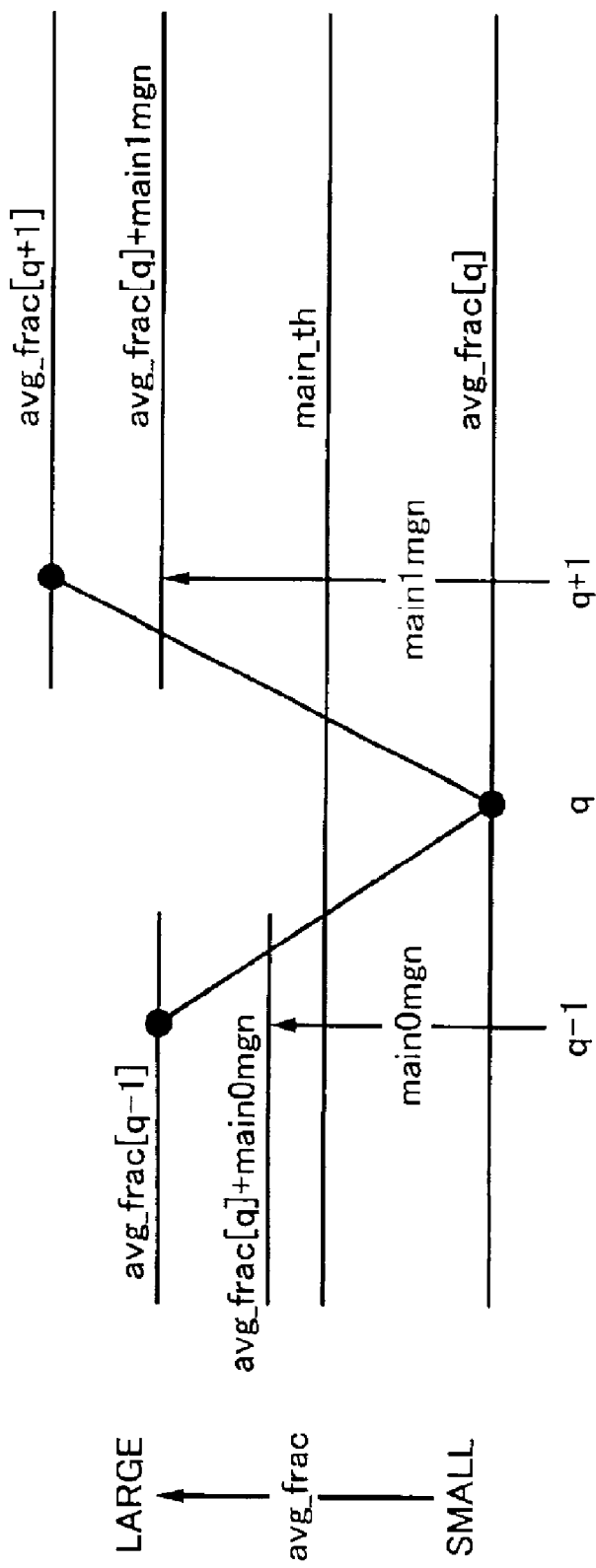
FIG. 14 is a schematic diagram for explaining a main back search.

Next, with reference to FIG. 14, the main back search will be described. In FIG. 14, successive quantizer scale codes (q−1), q, (q+1), and corresponding normalized cumulated values avg_frac[q−1], avg_frac[q], and avg_frac[q+1] are represented on a graph of broken lines. The main back search is applied when a considered normalized cumulated value avg_frac[q] is smaller than each of adjacent normalized cumulated values avg_frac[q−1] and avg_frac[q+1], if the normalized cumulated value avg_frac[q] clearly exists (hereinafter, the point of the normalized cumulated value avg_frac[q] is referred to as dip point).

In other words, when the value of the dip point is large and/or even if the number of effective samples non_zero used for obtaining the normalized cumulated value avg_frac[q] at the dip point is smaller than a predetermined value, when the considered normalized cumulated value avg_frac[q] is sufficiently smaller than the normalized cumulated value avg_frac[q−1] and avg_frac[q+1], the dip point more deeply exists.

Thus, when a deep dip point exits, it is assumed that the remainder of which the DCT coefficient is divided by a quantizer scale value Q corresponding to the dip point is [0]. Thus, it is determined that the DCT coefficient is exactly divided by the quantizer scale value corresponding to the dip point.

More practically, with reference to FIG. 14, the determination is performed corresponding to the following C language programming list. In the following programming list, a numeric value+":" at the beginning of each line represent a line number with which the corresponding step is described.

```
1: for (q = 1; q <= 31; q++) {
2:   main_bsr[q] = (non_zero[q] > main_nz) &
3:                 (avg_frac[q] < main_th) &
4:                 (avg_frac[q] + main0mgn < avg_frac[q − 1] &
5:                 (avg_frac[q] + main1mgn < avg_frac[q + 1]
6: }
```

In the programming list, items main_nz, main_th, main0mgn, and main1mgn are parameters. For example, the following values are given to them. In this example, the calculation word length is 30 bits.

main_nz=64
main_th=20480/2^21
main0mgn=4096/2^21
main1mgn=8192/2^21

In the forgoing list, line 1 represents that the process is successively performed for normalized cumulated values avg_frac[q] corresponding to all (31) quantizer scale codes q.

Lines 2 to 5 represent determination conditions for a dip point using the forgoing items. Line 2 represents that the lower limit value of the number of effective samples non_zero[q] used for obtaining the considered normalized cumulated value avg_frac[q] is designated by the item main_nz. In other words, line 2 represents that as a condition, the number of effective samples non_zero used for the back search in 504 DCT coefficients of one macro block should exceed the value represented by the lower limit value main_nz (in this example, 64 samples).

Line 3 represents that as a condition the considered normalized cumulated value avg_frac[q] is smaller than a threshold represented by the item main_th (in this example, 20480/2^21).

Lines 4 and 5 represent the relation between the normalized cumulated value avg_frac[q] and the normalized cumulated values avg_frac[q−1] and avg_frac[q+1]. The margin values main0mgn and main1mgn define the difference between the considered normalized cumulated value avg_frac[q] and the normalized cumulated values avg_frac[q−1] and avg_frac[q+1]. In other words, the difference between the normalized cumulated value avg_frac[q] and the quantized cumulated value avg_frac[q−1] whose quantizer scale codes are different by 1 from each other should be larger than the margin value main0mgn. Likewise, the difference between the normalized cumulated values avg_frac[q] and avg_frac[q+1] whose quantizer scale codes are different by 1 from each other should be larger than the margin value main1mgn.

In the example, the margin value main1mgn is twice as large as the margin value main0mgn. In such a manner, the margin values main0mgn and main1mgn that are thresholds of depths of the normalized cumulated values avg_frac[q−

1] and [q+1] against the dip point can be designated different values. Of course, the margin values main0mgn and main1mgn may be designated the same value. The relation between the margin values main0mgn and main1mgn may not be a multiple. The margin values main0mgna and main1mgn can be experimentally obtained.

Corresponding to a quantizer scale code q that satisfies all the determination conditions of lines 2 to 5, a back search detected value main_bsr[q]=1 of the main back search is obtained. In other words, it can be said that the DCT coefficient is exactly divided by the quantizer scale value Q corresponding to the quantizer scale code q represented by the back search detected value main_bsr[q].

Figure 15:
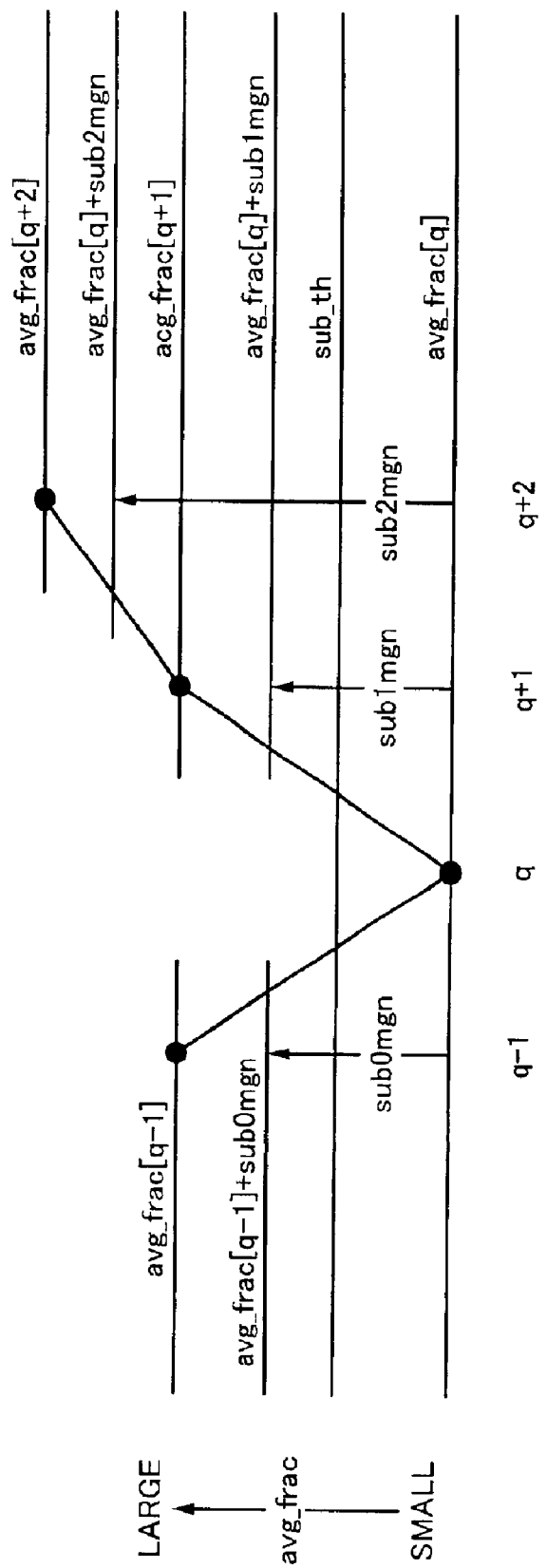
FIG. 15 is a schematic diagram for explaining a sub back search.

Next, with reference to FIG. 15, the sub back search will be described. FIG. 15 shows normalized cumulated values avg_frac[q−1], avg_frac[q], avg_frac[q+1], and avg_frac [q+2] corresponding to successive quantizer scale codes (q−1), q, (q+1), and (q+2) with a graph of broken lines. In the sub back search, when a dip point lesser clearly exist than that in the main back search, stricter restrictions are applied.

In other words, when the normalized cumulated value avg_frac[q] is not sufficiently smaller than the normalized cumulated values avg_frac[q−1] and avg_frac[q+1] whose quantizer scale codes are adjacent to the quantizer scale code of the normalized cumulated value avg_frac[q] and the depth of the dip point of the normalized cumulated value avg_frac[q] is not sufficient, if the dip point itself is large, there is a high possibility of which the normalized cumulated value avg_frac[q] corresponding to the dip point has been largely affected by noise. In addition, when the number of effecitve samples non_zero for obtaining the normalized cumulated value avg_frac[q] is small, the possibility of which the back search detection is incorrectly performed becomes high. In addition, when the dip point repeatedly takes place, it can be said that the possibility of which the normalized cumulated value avg_frac[q] is largely affected by noise.

Thus, according to the embodiment of the present invention, in the back search detection that is performed when a dip point does not relatively clearly exits, if the normalized cumulated value avg_frac[q] corresponding to the dip point is obtained with a sufficient number of effective samples non_zero, the reliability of the normalized cumulated value avg_frac[q] is high, and the normalized cumulated value avg_frac[q] is sufficiently small, to prevent the normalized cumulated value avg_frac[q] from being incorrectly detected due to noise, when the following condition is satisfied, it is assumed that the remainder of which the DCT coefficient is divided by the quantizer scale value Q corresponding to the dip point becomes [0] and that the DCT coefficient is exactly divided by the quantizer scale value Q corresponding to the dip point.

In other words, in addition to the normalized cumulated values avg_frac[q−1] and avg_frac[q+1] whose quantizer scale codes are different by 1 from that of the normalized cumulated value avg_frac[q] corresponding to the dip point, with the normalized cumulated values avg_frac[q+2] and avg_frac[q−2] whose quantizer scale codes are larger by 2 than that of the normalized cumulated value avg_frac[q] corresponding to the dip point, the determination is performed. In this case, a determination condition of which the normalized cumulated value avg_frac[q+2] does not become small than the normalized cumulated value avg_frac[q+1] is added.

More practically, with reference to FIG. 15, the determination is performed corresponding to the following C language programming list. In the following programming list, a numeric value+":" at the beginning of each line represent a line number with which the corresponding step is described.

```
1:  for (q = 1; q <= 31; q++) {
2:    sub_bsr[q] =   (non_zero[q] > sub_nz) &
3:                   (avg_frac[q] < sub_th) &
4:                   (avg_frac[q] + sub0mgn < avg_frac[q −
1] &
5:                   (avg_frac[q] + sub1mgn < avg_frac[q +
1]) &
6:                   (avg_frac[q] + sub1mgn < avg_frac[q +
2])
7:  }
```

In the programming list, items sub_nz, sub_th, sub0mgn, sub1mgn, and sub2mgn are parameters. For example, the following values are given to these items. In this example, the calculation word length is 30 bits.
sub_nz=128
sub_th=14336/2^21
sub0mgn=2048/2^21
sub1mgn=2048/2^21
sub2mgn=4096/2^21

In the forgoing programming list, line 1 represents that the process is performed for normalized cumulated values avg_frac[q] corresponding to all (31) quantizer scale codes q.

Lines 2 to 6 represent determination conditions of a dip point using the forgoing items. Line 2 represents that the lower limit value of the number of effective samples non_zero[q] obtained for the considered normalized cumulated value avg_frac[q] is designated by the item sub_nz. In other words, line 2 represents that as a condition the number of effective samples non_zero used for the back search in 504 DCT coefficients of one macro block should exceed the value represented by the item sub_nz (in this example, 128 DCT coefficients). Thus, the item sub_nz is designated a larger value than the item main_nz of the main back search.

Line 3 represents a condition of which the considered normalized cumulated value avg_frac[q] is smaller than the value represented by the item sub_th (in this example, 14336/2^21). Thus, the item sub_th is designated a smaller value than the item main_th of the forgoing main back search.

Lines 4 and 5 represent the relation between the normalized cumulated value avg_frac[q] and the normalized cumulated values avg_frac[q−1] and avg_frac[q+1]. The margin values sub0mgn and sub1mgn define the difference between the considered normalized cumulated value avg_frac[q] and the normalized cumulated values avg_frac[q−1] and avg_frac[q+1]. In other words, the difference between the normalized cumulated value avg_frac[q] and the normalized cumulated value avg_frac[q−1] whose quantizer scale code is smaller than that of the normalized cumulated value avg_frac[q] by 1 should be larger than the margin value sub0mgn. Likewise, the difference between the normalized cumulated value avg_frac[q] and the normalized cumulated value avg_frac[q+1] whose quantizer scale code is larger than that of the normalized cumulated value avg_frac[q] by 1 should be larger than the margin value sub1mgn.

In the sub back search, line 6 represents the relation between the normalized cumulated value avg_frac[q] and the normalized cumulated value avg_frac[q+2]. The difference between the considered normalized cumulated value avg_frac[q] and the normalized cumulated value avg_frac[q+2] whose quantizer scale code is larger than that of the normalized cumulated value avg_frac[q] by 2 should be larger than the margin value sub2mgn. In addition, the margin value sub2mgn is larger than the forgoing margin value sub1mgn.

Corresponding to a quantizer scale code q that satisfies all the determination conditions of lines 2 to 7, a back search detected value sub_bsr[q]=1 of the sub back search is obtained. In other words, it is assumed that the DCT coefficient is exactly divided by the quantizer scale value Q corresponding to the quantizer scale code q represented by the back search detected value sub_bsr[q].

Corresponding to the back search detected values main_bsr[q] and sub_bsr[q] obtained in the main back search and the sub back search, the quantizer scale value Q by which the DCT coefficient of the macro block is exactly divided is finally determined.

The margin values sub0mgn and sub1mgn designated in the sub back search are smaller than the margin values main0mgn and main1mgn designated in the main back search, respectively. In this example, the margin value sub0mgn is ½ of the margin value main0mgn of the main back search. The margin value sub1mgn is ¼ of the margin value main1mgn of the main back search. Thus, the detection in the sub back search can be performed with a shallower dip point than the detection in the main back search.

In this example, the margin values sub0mgn and sub1mgn are the same values. However, the present invention is not limited to such an example. In other words, the margin values sub0mgn and sub1mgn may be different values. In addition, the relation between the margin value main0mgn of the main back search and the margin value sub0mgn corresponding thereto is not always a multiple. Likewise, the relation between the margin value main1mgn of the main back search and the margin value sub1mgn corresponding thereto is not always a multiple.

A DCT coefficient that has been encoded is a multiple of a quantizer scale value used in an inverse quantizing process in a decoding process performed after the preceding encoding process. Thus, a DCT coefficient that has been encoded is a multiple of a quantizer scale value that is a divisor of a quantizer scale value used in the inverse quantizing process.

Thus, the maximum quantizer scale code of quantizer scale codes assigned for quantizer scale values that are divisors of a DCT coefficient that has been inversely quantized in a decoding process performed after the preceding encoding process is designated as a quantizer scale code that represents a quantizer scale value used in the preceding encoding process.

For example, with the forgoing back search detected values main_bsr[q] and sub_bsr[q], corresponding to the following C language programming list, a quantizer scale code coded Q that represents the finally determined quantizer scale value Q can be obtained.

coded [q]=0;

```
for (q = 31; q >= 1; q--) {
    cd[q] = (main_bsr[q] | sub_bsr[q]);
    if (cd[q] == 1) {
        codedQ;
        break;
    }
}
```

In this programming list, a quantizer scale code is denoted by [q]. The quantizer scale code [q] is successively decremented from the maximum value by 1 until a value cd[q]=1 is found. After the value cd[q]=1 is found, the flow exits (breaks) from the loop. In such a manner, the maximum quantizer scale code [q] of which cg[q]=1 is selected.

When the final quantizer scale value Q is determined, whether to execute the forgoing main back search and sub back search and whether to use the back search detected values main_bsr[q] and sub_bsr[q] detected by the main back search and the sub back search can be designated for each quantizer scale code. For example, when the quantizer scale codes are q=1 and 31, since there is no quantizer scale code that is smaller than the quantizer scale code q=1 and there is no quantizer scale code that is larger than the quantizer scale code q=31, these quantizer scale codes can be designated so that the main back search and the sub back search are not performed. Likewise, when the quantizer scale code is q=30, since there is no quantizer scale code that is larger than the quantizer scale code q=30 by 2, the quantizer scale code q=30 can be designates so that the sub back search is not performed.

Figure 16:
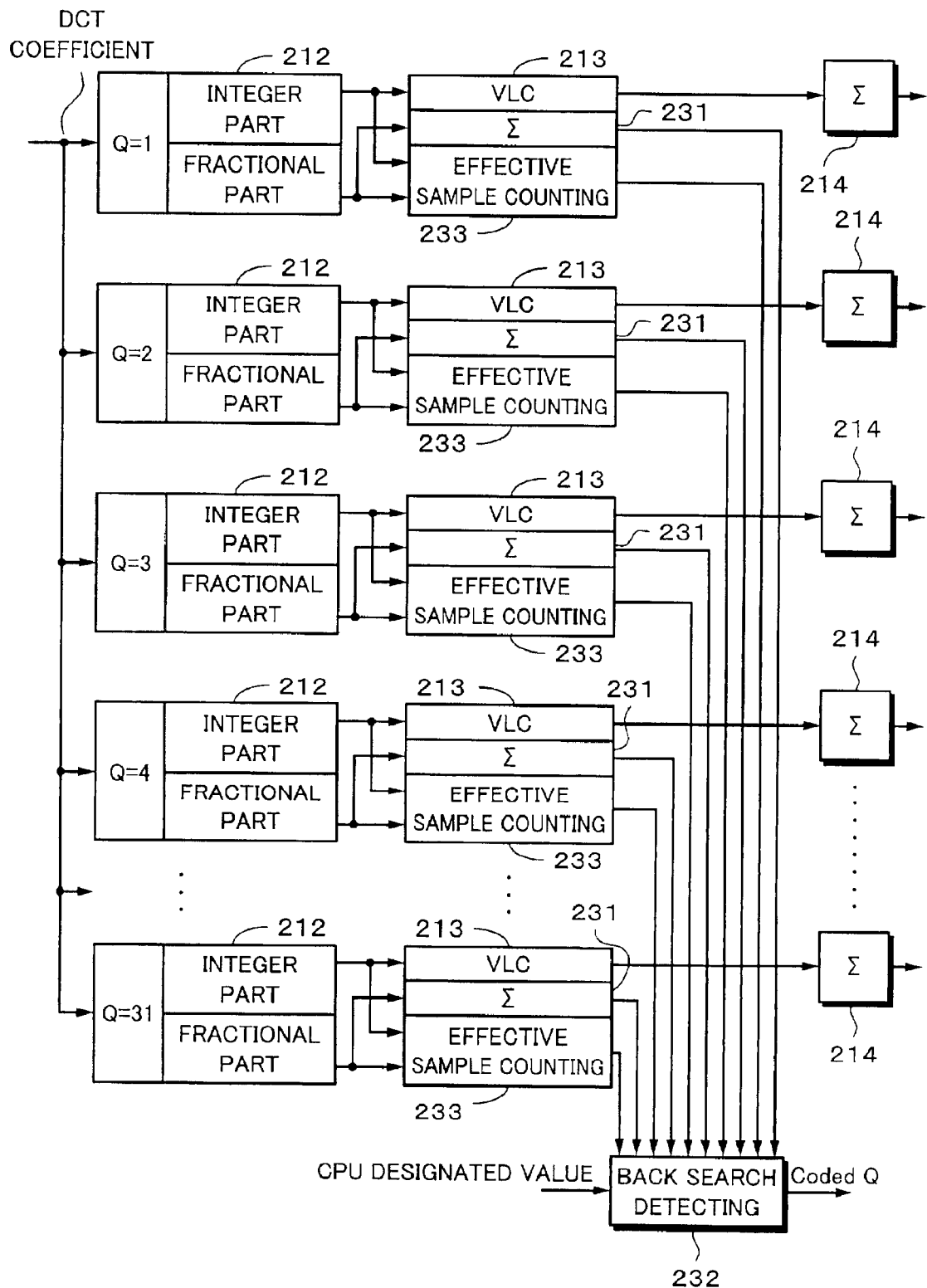
FIG. 16 is a block diagram showing an example of the structure that performs the back search detection.
Figure 17B:
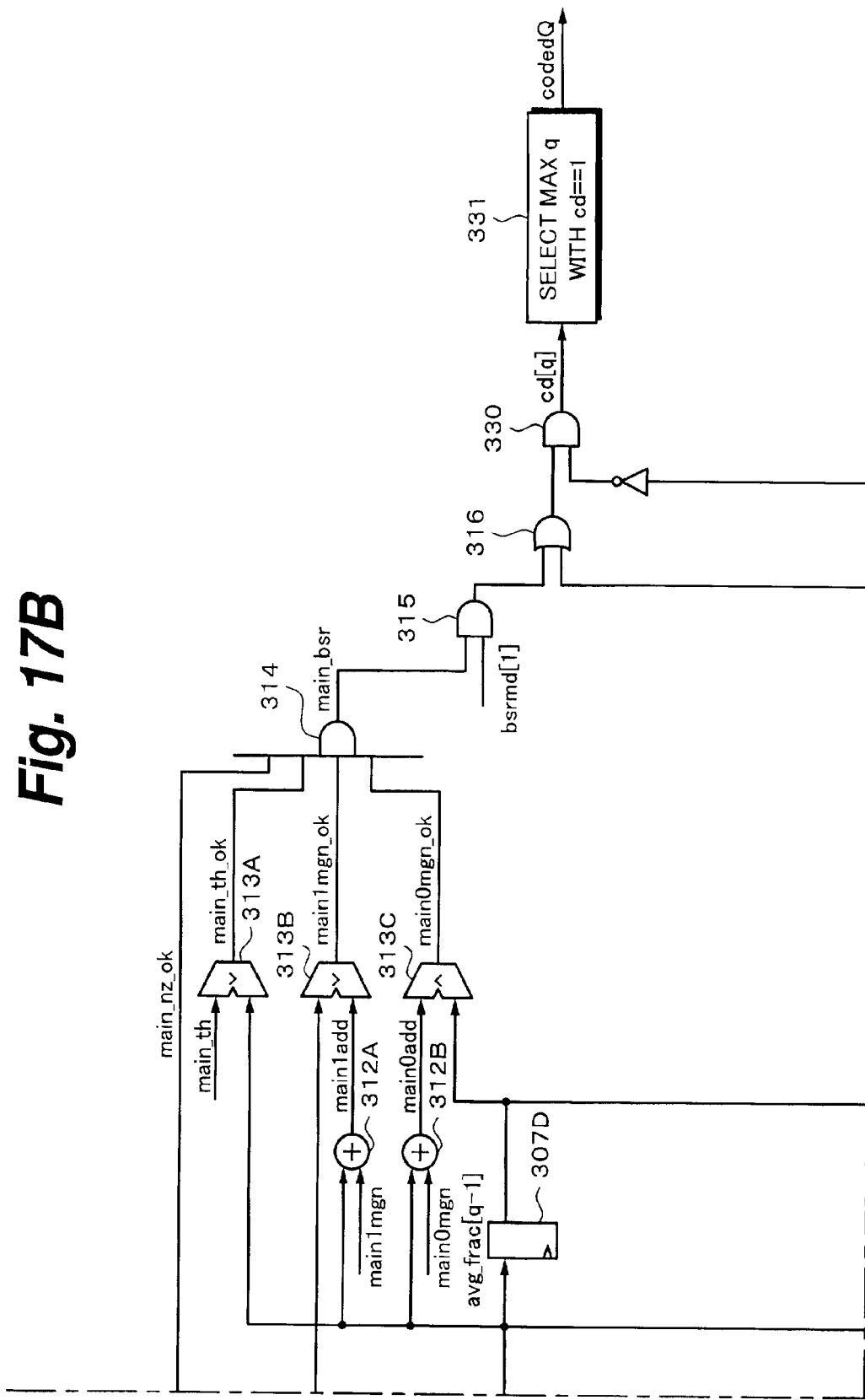
Figure 17C:
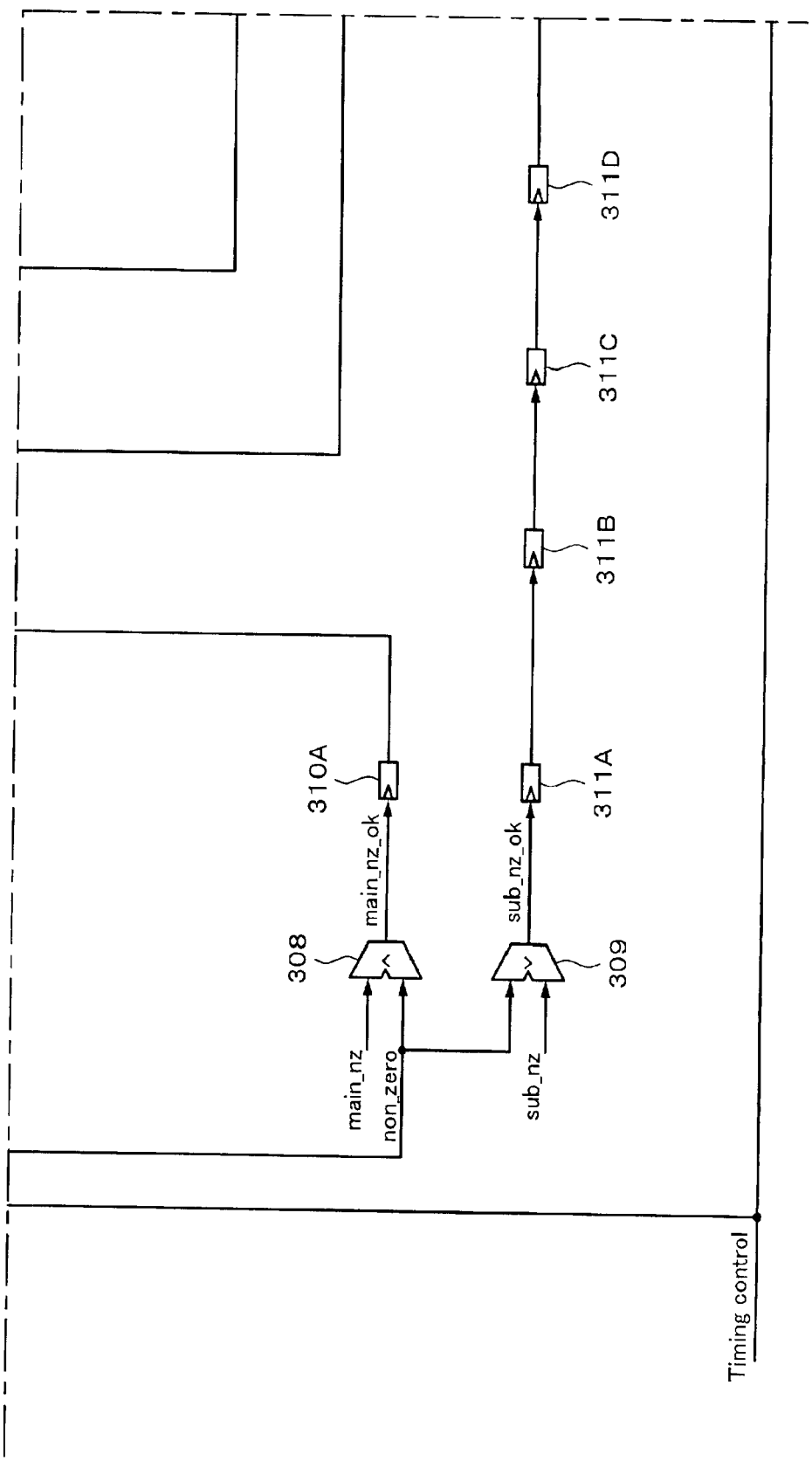
Figure 17D:
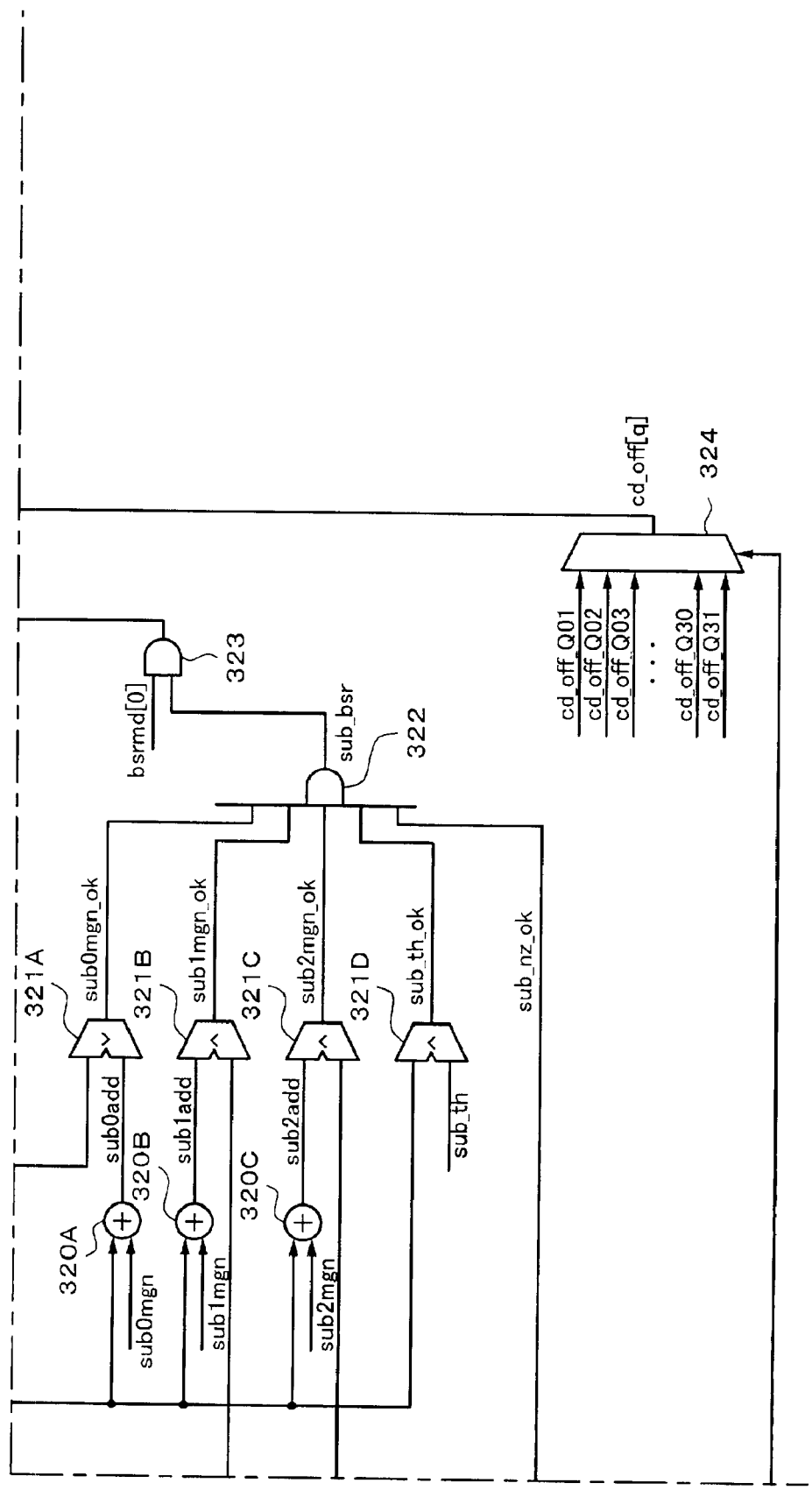

FIG. 16 shows an example of the structure that performs the forgoing back search detection. FIG. 16 is a part of the structure shown in FIGS. 2A, 2B, and 2C. Thus, for simplicity, in FIG. 16, similar portions to those in FIGS. 2A, 2B, and 2C will be denoted by similar reference numerals and their detailed description will be omitted. In FIGS. 2A, 2B, and 2C, fixed quantizer scale values Q are assigned to multi-staged quantizing blocks 212, 212, . . . . The quantizer scale values Q that are prescribed in the MPEG2 are a total of 31 numeric values composed of successive numeric values [1] to [8] and intermittent numeric values [10] to [112]. Corresponding to the quantizer scale values Q, 31 quantizing portions (Q_n portions) 212, 212, . . . are disposed.

A DCT coefficient that is output from a quantizer table portion 211A is supplied to the quantizing portions 212, 212, . . . . The DCT coefficient is quantized with quantizer scale values Q assigned to the quantizing portions 212, 212, . . . . Integer parts (integer parts D1 shown in FIG. 13) of the quantized values are supplied to corresponding VLCs 213, 213 . . . . The VLCs 213, 213, . . . encode the integer parts with a variable length code. Outputs of the VLC portion 213, 213, . . . are supplied to corresponding cumulating portions Σ 214, 214, . . . as was described with reference to FIGS. 2A, 2B, and 2C.

On the other hand, fractional parts (cumulation parts D3 shown in FIG. 13) quantized by the quantizing portions 212, 212, . . . are supplied to corresponding cumulating portions Σ 231, 231, . . . . As was described above, when a fractional part exceeds [0.5], the corresponding cumulating portion Σ 231 cumulates it as an error with the closest integer value for each macro block. A cumulated value frac_ttl for each quantizer scale value Q is supplied to a back search detecting portion 232.

The integer parts and fractional parts of the values quantized by the quantizing blocks 212, 212 . . . are supplied to significant sample counting portions 233, 233, . . . . As was described with reference to FIG. 13, the significant sample counting portions 233, 233, . . . count DCT coefficients whose integer part D1 and fractional part D3 are not [0] from 504 DCT coefficients (63 AC coefficients×8 DCT blocks) of one macro block. The number of effective samples non_zero that has been counted for each quantizer scale value Q is supplied to the back search detecting portion 232.

With the cumulated value frac_ttl for each quantizer scale value Q supplied from the cumulating portions Σ 231, 231, . . . and the number of effective samples non_zero for each quantizer scale value Q supplied from the significant sample counting portion 233, 233, . . . , the back search detecting portion 232 performs the main back search and the sub back search in the forgoing manner and determines a quantizer scale value Q (codedQ) in the preceding encoding process.

When a quantizer scale value Q has not been detected in the back search, codedQ=0 is supplied to a rate controlling portion 217. The rate controlling portion 217 performs the rate control using the quantizer scale value Q by the code amount control.

FIGS. 17A, 17B, 17C, and 17D show the structure of an example of the back search detecting portion 232. Cumulated values frac_ttl_Qxx (where xx=01, 02, . . . , 31) supplied from the cumulating portions Σ 231, 231, . . . are supplied to a time series arranging circuit 300. Corresponding to a timing signal supplied from for example a timing generator TG 220, the time series arranging circuit 300 arranges the cumulated values frac_ttl_Qxx in the order of quantizer scale codes. The cumulated values frac_ttl arranged in time series are latched by a larch circuit 302. Thereafter, the cumulated values frac_ttl are input to a multiplicand input terminal that is one input terminal of a dividing circuit 303.

The number of effective samples non_zero_Qxx (where xx=01, 02, . . . , 31) supplied from each of the significant sample counting portion 233, 233, . . . is supplied to a time series arranging circuit 301. Corresponding to a timing signal supplied from for example the timing generator TG 220, the time series arranging circuit 301 arranges the numbers of effective samples in the order of quantizer scale values Q (namely, quantizer scale codes). The numbers of effective samples non_zero arranged in time series are supplied to comparators 308 and 309. In addition, the numbers of effective samples non_zero arranged in time series are supplied to a limiter 304. The numbers of effective samples non_zero supplied to the limiter 304 are restricted corresponding a value selected from lower limit values main_nz and sub_nz by a minimum value selecting circuit 305. In other words, corresponding to the lower limit value min_nz selected from the lower limit values main_nz and sub_nz by the minimum value selecting circuit 305, when the numbers of effective samples non_zero are smaller than the lower limit min_nz, the numbers of effective samples non_zero are restricted to the lower limit value min_nz.

The numbers of effective samples non_zero that are output from the limiter 304 are latched by a latch circuit 306. Thereafter, the numbers of effective samples are input to a divisor input terminal of the dividing circuit 303. The dividing circuit 303 divides the cumulated values frac_ttl by the numbers of effective samples non_zero in the order of the cumulated values and the numbers of effective samples arranged in the time series by the time series arranging circuits 300 and 301. The dividing circuit 303 outputs normalized cumulated values avg_frac.

The normalized cumulated values avg_frac corresponding to quantizer scale codes are latched by latch circuits 307A, 307B, 307C, and 307D. In other words, when the third latch circuit 307C latches the normalized cumulated value avg_frac[q] corresponding to the quantizer scale code [q], the latch circuits 307A and 307B latch the normalized cumulated values avg_frac[q+2] and avg_frac[q+1], whereas the latch circuit 307D latches the normalized cumulated value avg_frac[q−1].

The normalized cumulated value avg_frac[q+1] latched by the latch circuit 307B is input to one input terminal of the comparator 313B. The normalized cumulated value avg_frac[q−1] latched by the latch circuit 307D is input to one input terminal of the comparator 313C. An adding devices 312A and 312B add the margin value main1mgn and the margin value main0mgn to the normalized cumulated value avg_frac[q] latched by the latch circuit 307C, respectively. The resultant values are supplied to the other input terminals of the comparators 313B and 313C, respectively. In addition, the normalized cumulated value avg_frac[q] is input to one input terminal of the comparator 313A. The threshold main_th is input to the other input terminal of the comparator 313A.

In such a manner, the comparators 313A, 313B, and 313C compare the normalized cumulated values avg_frac[q−1], avg_frac[q], and avg_frac[q+1] whose quantizer scale codes are successive, the values of which the margin values main0mgn and main1mgn are added to the considered normalized cumulated value avg_frac[q], and the threshold main_th.

On the other hand, the lower limit value main_nz is input to the outer input terminal of the comparator 308. The comparator 308 compares the lower limit value main_nz and the number of effective samples non_zero that are input to the input terminals thereof. The comparator 308 determines whether or not the number of effective samples non_zero exceeds the lower limit value main_nz. When the number of effective samples non_zero exceeds the lower limit value main_nz, the comparator 308 outputs for example value [1] as a determined result main_nz_ok. When the number of effective samples non_zero does not exceed the lower limit value main_nz, the comparator 308 outputs for example value [2] as a determined result main_nz_ok.

Outputs of the comparators 313A, 313B, and 313C are input to a four-input AND circuit 314. In addition, the determined result main_nz_ok that is output from the comparator 308 is input to the AND circuit 314. The determined result main_nz_ok is latched by latch circuits 310A, 310B, 310C, and 310D so that the timing of the determined result main_nz_ok matches the timing of the normalized cumulated value avg_frac[q]. An output of the AND circuit 314 is a back search detected value main_bsr[q] of the main back search. In such a manner, the main back search described with reference to FIG. 14 is performed.

The back search detected value main_bsr that is output from the AND circuit 314 is input to one input terminal of an AND circuit 315. A signal bsrmd[1] representing whether to perform the main back search is input to the other input terminal of the AND circuit 315. An output of the AND circuit 315 is input to one input terminal of an OR circuit 316.

The sub back search is performed nearly in the same manner as the main back search. The normalized cumulated value avg_frac[q+2] latched by the latch circuit 307A is input to one input terminal of a comparator 321C. The normalized cumulated value avg_frac[q+1] latched by the latch circuit 307B is input to one input terminal of a comparator 321B. The normalized cumulated value avg_frac[q−1] latched by the latch circuit 307D is input to one input terminal of a comparator 321A.

Adding devices 320A, 320B, and 320C add the margin values sub0mgn, sub1mgn, and sub2mgn to the normalized cumulated value avg_frac[q] latched by a latch circuit 307C. The added results are input to the other input terminals of the comparators 321A, 321B, and 321C, respectively. In addition, the normalized cumulated value avg_frac[q] is input to one input terminal of a comparator 321D. The threshold sub_th is input to the other input terminal of the comparator 321D.

In such a manner, the comparators 321A, 321B, 321C, and 321D compare the normalized cumulated values avg_ frac[q−1], avg_frac[q], avg_frac[q+1], and avg_frac[q+2] whose quantizer scale codes are successive, values to which the margin values sub0mgn, sub1mgn, and sub2mgn are added to the considered normalized cumulated value avg_frac[q], and the threshold sub_th.

The processes of the comparators 321A, 321B, 321C, and 321D and the comparators 313A, 313B, and 313C are performed in parallel on hardware.

On the other hand, the lower limit value sub_nz is input to the other input terminal of the comparator 309. The comparator 309 compares the lower limit value sub_nz and the number of effeciive samples sub_nz that are input to the input terminals thereof. The comparator 309 determines whether or not the number of effective samples non_zero exceeds the lower limit value sub_nz. When the number of effective samples non_zero exceeds the lower limit value sub_nz, the comparator 309 outputs for example value [1] as a determined result sub_nz_ok. When the number of effective samples non_zero does not exceed the lower limit value sub_nz, the comparator 309 outputs for example value [0] as a determined result sub_nz_ok.

Outputs of the comparators 321A, 321B, 321C, and 321D are input to a five-input AND circuit 322. In addition, the determined result sub_nz_ok that is output from the comparator 309 is input to the AND circuit 322. The determined result sub_nz_ok is latched by latch circuits 311A, 311B, 311C, and 311D so that the timing of the determined result sub_nz_ok matches the timing of the normalized cumulated value avg_frac[q]. An output of the AND circuit 322 is a back search detected value sub_bsr of the sub back search. In such a manner, the sub back search described with reference to FIG. 15 is performed.

The back search detected value sub_bsr that is output from the AND circuit 322 is input to one input terminal of an AND circuit 323. A signal bsrmd[0] representing whether to perform the sub back search is input to the other input terminal of the AND circuit 323. An output of the AND circuit 323 is input to the other input terminal of the OR circuit 316. An output of the OR circuit 316 is input to one input terminal of an AND circuit 330.

On the other hand, signals cd_off_Qxx (where xx=01, 02, . . . , 31) that correspond to quantizer scale codes [q] and that represent whether to use the back search detected values main_bsr[q] and sub_bsr[q] detected by the main back search and the sub back search are input to a time series arranging circuit 324. The signals cd_off_Qxx are arranged in time series in the order of the quantizer scale codes corresponding to a timing signal supplied from for example the timing generator TG 220. Signals cd_off[q] that are output from the time series arranging circuit 324 are input to the other input terminal of the AND circuit 330 through an inverter. The timings of the signals cd_off_Qxx are matched with the timings of the back search detected values main_bsr[q] and sub_bsr[q] that are supplied to the AND circuit 330.

An output of the AND circuit 330 is the forgoing value cd[q]. The value cd[q] is supplied to a circuit 331. The maximum quantizer scale code [q] of which value cd[q]=[1] is obtained. The obtained quantizer scale code [q] is the quantizer scale code codedQ used in the preceding encoding process.

As was described above, the back search function according to the embodiment of the present invention can be accomplished by any one of hardware and software. A program for causing for example a computer apparatus to execute the back search process is recorded on a record medium such as a CD-ROM (Compact Disc—Read Only Memory) that is supplied. When the CD-ROM is loaded to a CD-ROM drive of the computer apparatus and the program recorded on the CD-ROM is installed to the computer apparatus, the forgoing process can be executed on the computer apparatus. Since the structure of the computer apparatus is well known, the description thereof will be omitted.

In the forgoing, an example of which an embodiment of the present invention is applied to the digital VTR was described. However, the present invention is not limited to such an example. For example, the present invention can be structured as a quantizing calculation circuit having the back search function. In addition, the present invention is also effectively applied when an encoder and a decoder are cascade connected in the case that data is repeatedly encoded and decoded among a plurality of devices other than a digital VTR.

As was described above, in the back search function according to an embodiment, a cumulated value of which fractional parts that take place in a quantizing process are cumulated is normalized with the number of effective samples thereof. Thus, an influence due to the difference of the number of cumulated samples can be excluded. As a result, the normalized cumulated value can be compared with predetermined parameter values. Consequently, the back search detection can be performed with higher accuracy.

In addition, with a normalized cumulated value avg_frac corresponding to a considered quantizer scale value and normalized cumulated values avg_frac corresponding to a plurality of quantizer scale values adjacent to the considered quantizer scale value, it is determined whether or not a DCT coefficient is exactly divisible. Thus, the back search detection can be prevented from being incorrectly performed.

What is claimed is:

1. An image processing apparatus, comprising:
quantizing means for quantizing a video signal with a plurality of different quantizer scale values so as to obtain quantized values corresponding to each of the quantizer scale values;
counting means for counting number of effective samples of the quantized values corresponding to each of the quantizer scale values so as to obtain the number of effective samples corresponding to each of the quantizer scale values;
cumulating means for cumulating fractional parts of the quantized values corresponding to each of the quantizer scale values so as to obtain a cumulated value corresponding to each of the quantizer scale values; and
back search means for detecting a quantizer scale value used in a preceding encoding process for the video signal using a cumulated value of quantized values whose number of effective samples exceeds a predetermined threshold from the plurality of different quantizer scale values.

2. The image processing apparatus as set forth in claim 1, wherein each of the effective samples is a sample of which both an integer part and a effective digit part of the fractional part of the quantized value are not 0.

3. The image processing apparatus as set forth in claim 1, wherein the quantizing means comprises:
candidate determining means for determining a quantizer scale value of the plurality of different quantizer scale values as an candidate quantizer scale value when the remainder of which a value of the video signal is divided by the quantizer scale value is considered as zero; and selecting means for selecting a quantizer scale value used in the preceding encoding process from the candidate quantizer scale values.

4. The image processing apparatus as set forth in claim 3, wherein the video signal is a transformed signal of which a base band video signal has been transform-encoded, and wherein the candidate determining means determines a quantizer scale value as the candidate quantizer scale value when the remainder of which the value of the transformed signal is divided by the quantizer scale value is considered as zero.

5. The image processing apparatus as set forth in claim 3, wherein the selecting means selects the maximum quantizer scale value of the candidate quantizer scale values as a quantizer scale value used in the preceding encoding process.

6. An image processing method, comprising the steps of:

quantizing a video signal with a plurality of different quantizer scale values so as to obtain quantized values corresponding to each of the quantizer scale values;

counting the number of effective samples of the quantized values corresponding to each of the quantizer scale values so as to obtain the number of effective samples corresponding to each of the quantizer scale values;

cumulating fractional parts of the quantized values corresponding to each of the quantizer scale values so as to obtain a cumulated value corresponding to each of the quantizer scale values; and detecting a quantizer scale value used in the preceding encoding process for the video signal using a cumulated value of quantized values whose number of effective samples exceeds a predetermined threshold from the plurality of different quantizer scale values.

7. The image processing method as set forth in claim 6, wherein each of the effective samples is a sample of which both an integer part and a significant digit part of a fractional part of a quantized value are not 0.

8. The image processing method as set forth in claim 6, wherein the quantizing step comprises the steps of:

determining a quantizer scale value of the plurality of different quantizer scale values as an candidate quantizer scale value when the remainder of which a value of the video signal is divided by the candidate quantizer scale value is considered as zero; and selecting a quantizer scale value used in the preceding encoding process from the candidate quantizer scale values.

9. The image processing method as set forth in claim 8, wherein the video signal is a transformed signal of which a base band video signal has been transform-encoded, and wherein the candidate determining step is performed by determining a quantizer scale value as the candidate quantizer scale value when the remainder of which the value of the transformed signal is divided by the quantizer scale value is considered as zero.

10. The image processing method as set forth in claim 8, wherein the selecting step is performed by selecting the maximum quantizer scale value of the candidate quantizer scale values as a quantizer scale value used in the preceding encoding process.

11. An image processing program for causing a computer apparatus to execute an image processing method, comprising the steps of:

quantizing a video signal with a plurality of different quantizer scale values so as to obtain quantized values corresponding to each of the quantizer scale values;

counting the number of effective samples of the quantized values corresponding to each of the quantizer scale values so as to obtain the number of effective samples corresponding to each of the quantizer scale values;

cumulating fractional parts of the quantized values corresponding to each of the quantizer scale values so as to obtain a cumulated value corresponding to each of the quantizer scale values; and detecting a quantizer scale value used in the preceding encoding process for the video signal using a cumulated value of quantized values whose number of effective samples exceeds a predetermined threshold from the plurality of different quantizer scale values.

12. An image processing apparatus, comprising:

quantizing means for quantizing a video signal with a plurality of different quantizer scale values so as to obtain quantized values corresponding to each of the quantizer scale values;

counting means for counting the number of effective samples of the quantized values corresponding to each of the quantizer scale values so as to obtain the number of effective samples corresponding to each of the quantizer scale values;

cumulating means for cumulating fractional parts of the quantized values corresponding to each of the quantizer scale values so as to obtain a cumulated value corresponding to each of the quantizer scale values;

normalizing means for normalizing the cumulated value corresponding to each of the quantizer scale values with a counted value corresponding thereto so as to obtain a normalized cumulated value; and back search means for detecting a quantizer scale value used in the preceding encoding process for the video signal with the normalized cumulated value.

13. The image processing apparatus as set forth in claim 12, wherein each of the effective samples is a sample of which both an integer part and a significant digit part of a fractional part of a quantized value are not 0.

14. The image processing apparatus as set forth in claim 12, wherein the quantizing means comprises:

candidate determining means for determining a quantizer scale value of the plurality of different quantizer scale values as an candidate quantizer scale value when the remainder of which a value of the video signal is divided by the candidate quantizer scale value is considered as zero; and selecting means for selecting a quantizer scale value used in the preceding encoding process from the candidate quantizer scale values.

15. The image processing apparatus as set forth in claim 14, wherein the video signal is a transformed signal of which a base band video signal has been transform-encoded, and wherein the candidate determining means determines a quantizer scale value as the candidate quantizer scale value when the remainder of which the value of the transformed signal is divided by the quantizer scale value is considered as zero.

16. The image processing apparatus as set forth in claim 14,
wherein the selecting means selects the maximum quantizer scale value of the candidate quantizer scale values as a quantizer scale value used in the preceding encoding process.

17. An image processing method, comprising the steps of:
quantizing a video signal with a plurality of different quantizer scale values so as to obtain quantized values corresponding to each of the quantizer scale values;
counting the number of effective samples of the quantized values corresponding to each of the quantizer scale values so as to obtain the number of effective samples corresponding to each of the quantizer scale values;
cumulating fractional parts of the quantized values corresponding to each of the quantizer scale values so as to obtain a cumulated value corresponding to each of the quantizer scale values;
normalizing a cumulated value corresponding to each of the quantizer scale values with a counted value corresponding thereto so as to obtain a normalized cumulated value; and
detecting a quantizer scale value used in the preceding encoding process for the video signal with the normalized cumulated value.

18. The image processing method as set forth in claim 17, wherein each of the effective samples is a sample of which both an integer part and a significant digit part of a fractional part of a quantized value are not 0.

19. The image processing method as set forth in claim 17, wherein the quantizing step comprises the steps of:
determining a quantizer scale value of the plurality of different quantizer scale values as an candidate quantizer scale value when the remainder of which a value of the video signal is divided by the candidate quantizer scale value is considered as zero; and
selecting a quantizer scale value used in the preceding encoding process from the candidate quantizer scale values.

20. The image processing method as set forth in claim 19, wherein the video signal is a transformed signal of which a base band video signal has been transform-encoded, and
wherein the candidate determining step is performed by determining a quantizer scale value as the candidate quantizer scale value when the remainder of which the value of the transformed signal is divided by the quantizer scale value is considered as zero.

21. The image processing method as set forth in claim 19, wherein the selecting step is performed by selecting the maximum quantizer scale value of the candidate quantizer scale values as a quantizer scale value used in the preceding encoding process.

22. An image processing program for causing a computer apparatus to execute an image processing method, comprising the steps of:
quantizing a video signal with a plurality of different quantizer scale values so as to obtain quantized values corresponding to each of the quantizer scale values;
counting the number of effective samples of the quantized values corresponding to each of the quantizer scale values so as to obtain the number of effective samples corresponding to each of the quantizer scale values;
cumulating fractional parts of the quantized values corresponding to each of the quantizer scale values so as to obtain a cumulated value corresponding to each of the quantizer scale values;
normalizing a cumulated value corresponding to each of the quantizer scale values with a counted value corresponding thereto so as to obtain a normalized cumulated value; and
detecting a quantizer scale value used in the preceding encoding process for the video signal with the normalized cumulated value.

23. An image processing apparatus, comprising:
quantizing means for quantizing a video signal with a plurality of different quantizer scale values so as to obtain quantized values corresponding to each of the quantizer scale values;
cumulating means for cumulating fractional parts of the quantized values corresponding to each of the quantizer scale values so as to obtain a cumulated value corresponding to each of the quantizer scale values; and
back search means for detecting a quantizer scale value used in the preceding encoding process for the video signal with a first cumulated value cumulated by the cumulating means corresponding to a considered first quantizer scale value and second and third cumulated values cumulated by the cumulating means corresponding to second and third quantizer scale values represented by quantizer scale codes that are different from a quantizer scale code that represents the first quantizer scale value by 1.

24. The image processing apparatus as set forth in claim 23,
wherein the back search means determines the first quantizer scale value as the quantizer scale value used in the preceding encoding process for the input video signal when the first cumulated value is sufficiently smaller than the second cumulated value and the third cumulated value.

25. The image processing apparatus as set forth in claim 23,
wherein the back search means detects a quantizer scale value used in the preceding encoding process together with a fourth cumulated value cumulated by the cumulating means corresponding to a fourth quantizer scale value represented by a quantizer scale code that is different from the quantizer scale code that represents the first quantizer scale value by 2.

26. The image processing apparatus as set forth in claim 25,
wherein the quantizer scale code that represents the fourth quantizer scale code is a quantizer scale code that is larger than the quantizer scale code that represents the first quantizer scale value by 2.

27. The image processing apparatus as set forth in claim 25,
wherein the back search means determines the first cumulated value as a quantizer scale value used in the preceding encoding process for the input video data when the first cumulated value is smaller than the second cumulated value and the third cumulated value, the fourth cumulated value is larger than the second cumulated value or the third cumulated value whose quantizer scale code is different from a quantizer scale code corresponding to the fourth cumulated value by 1, the first cumulated value is a reliable value, and the first cumulated value is sufficiently small.

28. The image processing apparatus as set forth in claim 23,
wherein the quantizing means comprises:
candidate determining means for determining a quantizer scale value of the plurality of different quantizer scale values as an candidate quantizer scale value when the remainder of which a value of the video signal is divided by the candidate quantizer scale value is considered as zero; and
selecting means for selecting a quantizer scale value used in the preceding encoding process from the candidate quantizer scale values.

29. The image processing apparatus as set forth in claim 28,
wherein the video signal is a transformed signal of which a base band video signal has been transform-encoded, and
wherein the candidate determining means determines a quantizer scale value as the candidate quantizer scale value when the remainder of which the value of the transformed signal is divided by the quantizer scale value is considered as zero.

30. The image processing apparatus as set forth in claim 28,
wherein the selecting means selects the maximum quantizer scale value of the candidate quantizer scale values as a quantizer scale value used in the preceding encoding process.

31. An image processing method, comprising the steps of:
quantizing a video signal with a plurality of different quantizer scale values so as to obtain quantized values corresponding to each of the quantizer scale values;
cumulating fractional parts of the quantized values corresponding to each of the quantizer scale values so as to obtain a cumulated value corresponding to each of the quantizer scale values; and
detecting a quantizer scale value used in the preceding encoding process for the video signal with a first cumulated value cumulated at the cumulating step corresponding to a considered first quantizer scale value and second and third cumulated values cumulated at the cumulating step corresponding to second and third quantizer scale values represented by quantizer scale codes that are different from a quantizer scale code that represents the first quantizer scale value by 1.

32. The image processing method as set forth in claim 31,
wherein the back search step is performed by determining the first quantizer scale value as the quantizer scale value used in the preceding encoding process for the input video signal when the first cumulated value is sufficiently smaller than the second cumulated value and the third cumulated value.

33. The image processing method as set forth in claim 31,
wherein the back search step is performed by detecting a quantizer scale value used in the preceding encoding process together with a fourth cumulated value cumulated at the cumulating step corresponding to a fourth quantizer scale value represented by a quantizer scale code that is different from the quantizer scale code that represents the first quantizer scale value by 2.

34. The image processing method as set forth in claim 33,
wherein the quantizer scale code that represents the fourth quantizer scale code is a quantizer scale code that is larger than the quantizer scale code that represents the first quantizer scale value by 2.

35. The image processing method as set forth in claim 33,
wherein the back search step is performed by determining the first cumulated value as a quantizer scale value used in the preceding encoding process for the input video data when the first cumulated value is smaller than the second cumulated value and the third cumulated value, the fourth cumulated value is larger than the second cumulated value or the third cumulated value whose quantizer scale code is different from a quantizer scale code corresponding to the fourth cumulated value by 1, the first cumulated value is a reliable value, and the first cumulated value is sufficiently small.

36. The image processing method as set forth in claim 31,
wherein the quantizing step comprises the steps of:
determining a quantizer scale value of the plurality of different quantizer scale values as an candidate quantizer scale value when the remainder of which a value of the video signal is divided by the candidate quantizer scale value is considered as zero; and
selecting a quantizer scale value used in the preceding encoding process from the candidate quantizer scale values.

37. The image processing method as set forth in claim 36,
wherein the video signal is a transformed signal of which a base band video signal has been transform-encoded, and
wherein the candidate determining step is performed by determining a quantizer scale value as the candidate quantizer scale value when the remainder of which the value of the transformed signal is divided by the quantizer scale value is considered as zero.

38. The image processing method as set forth in claim 36,
wherein the selecting step is performed by selecting the maximum quantizer scale value of the candidate quantizer scale values as a quantizer scale value used in the preceding encoding process.

39. An image processing program for causing a computer apparatus to execute an image processing method, comprising the steps of:
quantizing a video signal with a plurality of different quantizer scale values so as to obtain quantized values corresponding to each of the quantizer scale values;
cumulating fractional parts of the quantized values corresponding to each of the quantizer scale values so as to obtain a cumulated value corresponding to each of the quantizer scale values; and
detecting a quantizer scale value used in the preceding encoding process for the video signal with a first cumulated value cumulated at the cumulating step corresponding to a considered first quantizer scale value and second and third cumulated values cumulated at the cumulating step corresponding to second and third quantizer scale values represented by quantizer scale codes that are different from a quantizer scale code that represents the first quantizer scale value by 1.

40. An image processing apparatus, comprising:
quantizing means for quantizing a video signal with a plurality of different quantizer scale values so as to obtain quantized values corresponding to each of the quantizer scale values;
cumulating means for cumulating fractional parts of the quantized values corresponding to each of the quantizer scale values so as to obtain a cumulated value corresponding to each of the quantizer scale values; and
back search means for detecting a quantizer scale value used in the preceding encoding process for the video signal, the back search means being a combination of:

a first back search process using a first cumulated value cumulated by the cumulating means corresponding to a considered first quantizer scale value and second and third cumulated values cumulated by the cumulating means corresponding to second and third quantizer scale values represented by quantizer scale codes that are different from a quantizer scale code that represents the first quantizer scale value by 1, and a second back search process using the first cumulated value, the second cumulated value, the third cumulated value, and a fourth cumulated value cumulated by the cumulating means corresponding to a fourth quantizer scale code represented by a quantizer scale code that is different from the quantizer scale code that represents the first quantizer scale value by 2.

41. The image processing apparatus as set forth in claim 40, wherein the quantizer scale code that represents the fourth quantizer scale code is a quantizer scale code that is larger than the quantizer scale code that represents the first quantizer scale value by 2.

42. The image processing apparatus as set forth in claim 40, wherein in the first back search process, the back search means determines the first quantizer scale value as the quantizer scale value used in the preceding encoding process for the input video signal when the first cumulated value is sufficiently smaller than the second cumulated value and the third cumulated value, and wherein in the second back search process, the back search means determines the first cumulated value as a quantizer scale value used in the preceding encoding process for the input video data when the first cumulated value is smaller than the second cumulated value and the third cumulated value, the fourth cumulated value is larger than the second cumulated value or the third cumulated value whose quantizer scale code is different from a quantizer scale code corresponding to the fourth cumulated value by 1, the first cumulated value is a reliable value, and the first cumulated value is sufficiently small.

43. The image processing apparatus as set forth in claim 40, wherein the quantizing means comprises:

candidate determining means for determining a quantizer scale value of the plurality of different quantizer scale values as an candidate quantizer scale value when the remainder of which a value of the video signal is divided by the candidate quantizer scale value is considered as zero; and selecting means for selecting a quantizer scale value used in the preceding encoding process from the candidate quantizer scale values.

44. The image processing apparatus as set forth in claim 43, wherein the video signal is a transformed signal of which a base band video signal has been transform-encoded, and wherein the candidate determining means determines a quantizer scale value as the candidate quantizer scale value when the remainder of which the value of the transformed signal is divided by the quantizer scale value is considered as zero.

45. The image processing apparatus as set forth in claim 43, wherein the selecting means selects the maximum quantizer scale value of the candidate quantizer scale values as a quantizer scale value used in the preceding encoding process.

46. An image processing method, comprising the steps of:

quantizing a video signal with a plurality of different quantizer scale values so as to obtain quantized values corresponding to each of the quantizer scale values;

cumulating fractional parts of the quantized values corresponding to each of the quantizer scale values so as to obtain a cumulated value corresponding to each of the quantizer scale values; and detecting a quantizer scale value used in the preceding encoding process for the video signal, the back search step being a combination of:

a first back search process using a first cumulated value cumulated at the cumulating step corresponding to a considered first quantizer scale value and second and third cumulated values cumulated at the cumulating step corresponding to second and third quantizer scale values represented by quantizer scale codes that are different from a quantizer scale code that represents the first quantizer scale value by 1, and a second back search process using the first cumulated value, the second cumulated value, the third cumulated value, and a fourth cumulated value cumulated at the cumulating step corresponding to a fourth quantizer scale code represented by a quantizer scale code that is different from the quantizer scale code that represents the first quantizer scale value by 2.

47. The image processing method as set forth in claim 46, wherein the quantizer scale code that represents the fourth quantizer scale code is a quantizer scale code that is larger than the quantizer scale code that represents the first quantizer scale value by 2.

48. The image processing method as set forth in claim 46, wherein in the first back search process, the back search step is performed by determining the first quantizer scale value as the quantizer scale value used in the preceding encoding process for the input video signal when the first cumulated value is sufficiently smaller than the second cumulated value and the third cumulated value, and wherein in the second back search process, the back search step is performed by determining the first cumulated value as a quantizer scale value used in the preceding encoding process for the input video data when the first cumulated value is smaller than the second cumulated value and the third cumulated value, the fourth cumulated value is larger than the second cumulated value or the third cumulated value whose quantizer scale code is different from a quantizer scale code corresponding to the fourth cumulated value by 1, the first cumulated value is a reliable value, and the first cumulated value is sufficiently small.

49. The image processing method as set forth in claim 46, wherein the quantizing step comprises the steps of:

determining a quantizer scale value of the plurality of different quantizer scale values as an candidate quantizer scale value when the remainder of which a value of the video signal is divided by the candidate quantizer scale value is considered as zero; and selecting a quantizer scale value used in the preceding encoding process from the candidate quantizer scale values.

50. The image processing method as set forth in claim 49, wherein the video signal is a transformed signal of which a base band video signal has been transform-encoded, and wherein the candidate determining step is performed by determining a quantizer scale value as the candidate quantizer scale value when the remainder of which the value of the transformed signal is divided by the quantizer scale value is considered as zero.

51. The image processing method as set forth in claim 49, wherein the selecting step is performed by selecting the maximum quantizer scale value of the candidate quantizer scale values as a quantizer scale value used in the preceding encoding process.

52. An image processing program for causing a computer apparatus to execute an image processing method, comprising the steps of:

quantizing a video signal with a plurality of different quantizer scale values so as to obtain quantized values corresponding to each of the quantizer scale values;

cumulating fractional parts of the quantized values corresponding to each of the quantizer scale values so as to obtain a cumulated value corresponding to each of the quantizer scale values; and detecting a quantizer scale value used in the preceding encoding process for the video signal, the back search step being a combination of:

a first back search process using a first cumulated value cumulated at the cumulating step corresponding to a considered first quantizer scale value and second and third cumulated values cumulated at the cumulating step corresponding to second and third quantizer scale values represented by quantizer scale codes that are different from a quantizer scale code that represents the first quantizer scale value by 1, and a second back search process using the first cumulated value, the second cumulated value, the third cumulated value, and a fourth cumulated value cumulated at the cumulating step corresponding to a fourth quantizer scale code represented by a quantizer scale code that is different from the quantizer scale code that represents the first quantizer scale value by 2.

* * * * *